United States Patent
Omeragic et al.

(10) Patent No.: US 7,202,670 B2
(45) Date of Patent: Apr. 10, 2007

(54) METHOD FOR CHARACTERIZING A SUBSURFACE FORMATION WITH A LOGGING INSTRUMENT DISPOSED IN A BOREHOLE PENETRATING THE FORMATION

(75) Inventors: Dzevat Omeragic, Sugar Land, TX (US); Qiming Li, Sugar Land, TX (US); Lawrence Chou, Pearland, TX (US); Libo Yang, Sugar Land, TX (US); Chengbing Liu, Houston, TX (US); Jan Smits, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 238 days.

(21) Appl. No.: 10/710,188

(22) Filed: Jun. 24, 2004

(65) Prior Publication Data

US 2005/0083063 A1   Apr. 21, 2005

Related U.S. Application Data

(60) Provisional application No. 60/493,747, filed on Aug. 8, 2003.

(51) Int. Cl.
*G01B 3/08* (2006.01)
(52) U.S. Cl. .................................... 324/338
(58) Field of Classification Search ......... None
See application file for complete search history.

(56) References Cited

U.S. PATENT DOCUMENTS

| | | |
|---|---|---|
| 5,235,285 A | 8/1993 | Clark et al. |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,377,050 B1 | 4/2002 | Chemali et al. |
| 6,380,744 B1 | 4/2002 | Clark et al. |
| 6,541,979 B2 | 4/2003 | Omeragic |
| 6,556,015 B1 | 4/2003 | Omeragic et al. |
| 6,557,794 B2 | 5/2003 | Rosthal et al. |
| 6,566,881 B2 | 5/2003 | Omeragic et al. |
| 6,573,722 B2 | 6/2003 | Rosthal et al. |

(Continued)

FOREIGN PATENT DOCUMENTS

GB    2379985    3/2003

(Continued)

*Primary Examiner*—Jay M. Patidar
(74) *Attorney, Agent, or Firm*—Bryan L. White; Kevin P. McEnaney; Dak V. Gandier

(57) ABSTRACT

A method is described for characterizing a subsurface formation with a logging instrument disposed in a borehole penetrating the formation. The logging instrument is equipped with at least a transmitter system and a receiver system. The method entails positioning the logging instrument within the borehole so that the transmitter system and receiver system are disposed in the vicinity of a formation boundary of interest and measuring the azimuthal orientation of the logging instrument. Electromagnetic energy is transmitted into the formation using the transmitter system and signals associated with the transmitted electromagnetic energy are measured using the receiver system. The method further entails determining the relative azimuth of the formation boundary, composing a symmetrized directional measurement using the measured signals and the determined relative boundary azimuth, and determining the relative dip of the formation boundary using the composed directional measurement.

60 Claims, 14 Drawing Sheets

U.S. PATENT DOCUMENTS

| | | |
|---|---|---|
| 6,584,408 B2 | 6/2003 | Omeragic |
| 6,594,584 B1 | 7/2003 | Omeragic et al. |
| 6,624,634 B2 | 9/2003 | Rosthal et al. |
| 6,630,830 B2 | 10/2003 | Omeragic et al. |
| 6,667,620 B2 | 12/2003 | Homan et al. |
| 6,969,994 B2 | 11/2005 | Minerbo et al. |
| 2002/0057210 A1 | 5/2002 | Frey et al. |
| 2002/0079899 A1 | 6/2002 | Frey et al. |
| 2003/0085707 A1 | 5/2003 | Minerbo et al. |
| 2003/0184304 A1 | 10/2003 | Homan et al. |
| 2003/0184488 A1 | 10/2003 | Smith et al. |
| 2003/0200029 A1 | 10/2003 | Omeragic et al. |
| 2003/0229450 A1 | 12/2003 | Strickland |
| 2005/0140373 A1 | 6/2005 | Li et al. |

FOREIGN PATENT DOCUMENTS

| | | |
|---|---|---|
| GB | 2382659 | 6/2003 |
| GB | 2396018 | 6/2004 |

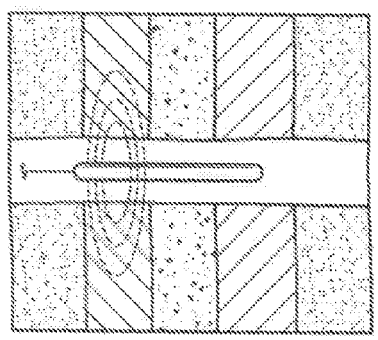
FIG. 2A
(PRIOR ART)
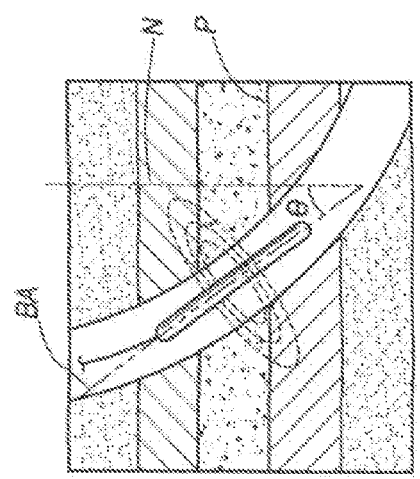
FIG. 2B
(PRIOR ART)
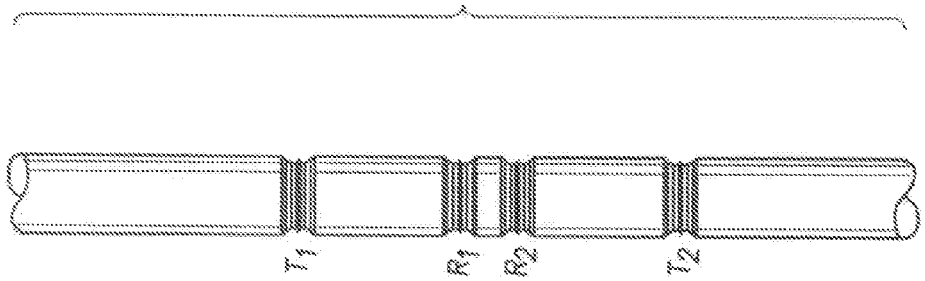
FIG. 1
(PRIOR ART)

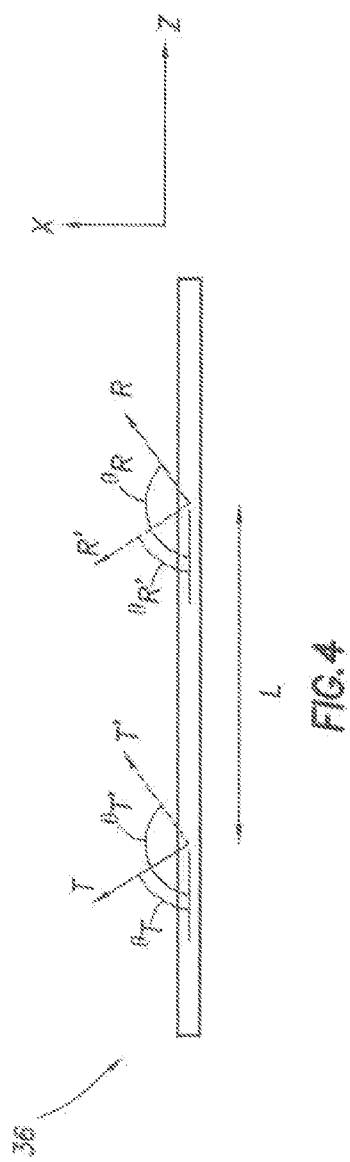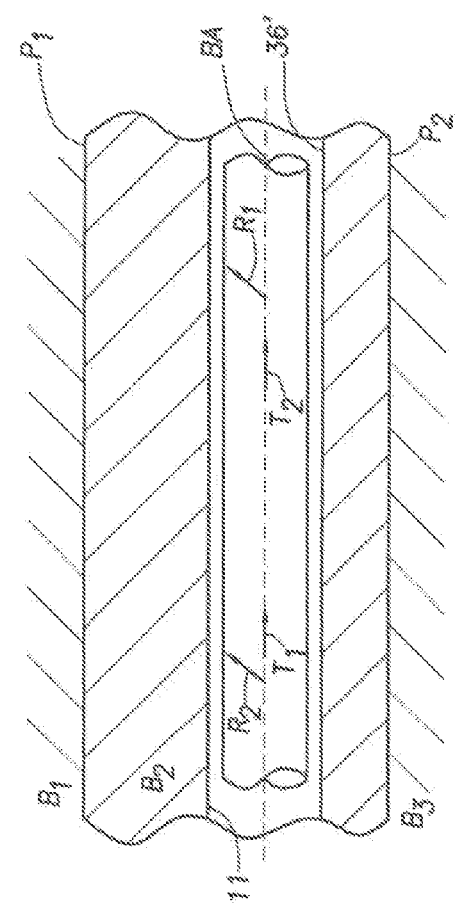

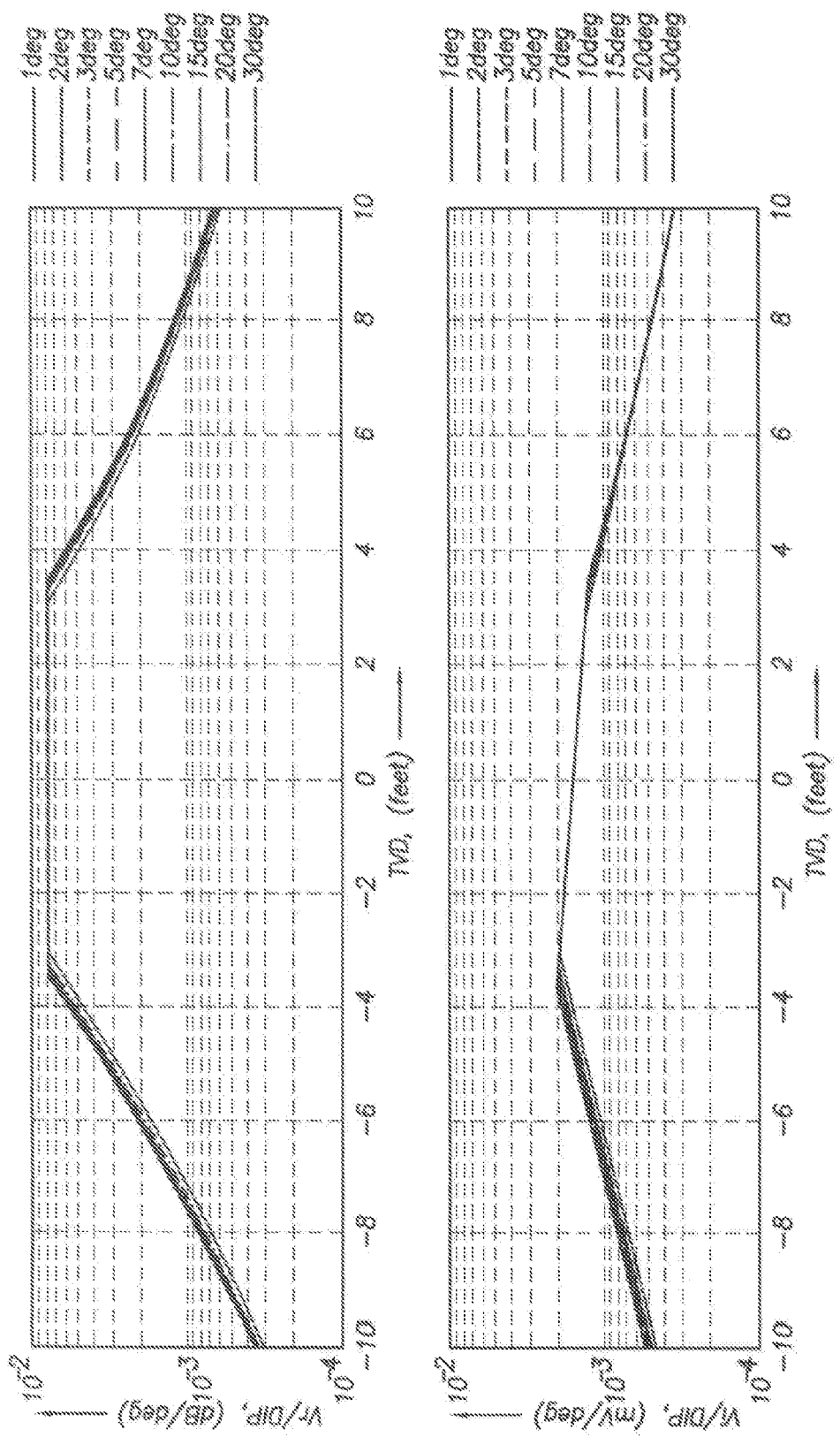

METHOD FOR CHARACTERIZING A SUBSURFACE FORMATION WITH A LOGGING INSTRUMENT DISPOSED IN A BOREHOLE PENETRATING THE FORMATION

CROSS-REFERENCE TO RELATED APPLICATIONS

This application claims priority, under 35 U.S.C. § 119, to Provisional Application Ser. No. 60/493,747, filed on Aug. 8, 2003, incorporated by reference in its entirety.

BACKGROUND OF THE INVENTION

1. Field of the Invention

The invention relates generally to the field of well logging. More particularly, the invention relates to improved techniques in which instruments equipped with antenna systems having transverse or tilted magnetic dipole-moment representations are used for electromagnetic measurements of subsurface formations and for defining the reservoir bedding structure and formation dip, as well as placing wells with respect to geological boundaries in a reservoir.

2. Background of the Related Art

Information that characterizes dips within a subsurface formation of interest is important for understanding the deposition environment of the sedimentary rocks, and for the development and execution of a well drilling plan for oil and gas exploration. The dip and strike of a formation bed can be extracted from seismic maps and from borehole images. Seismic maps provide large-scale structural information, and borehole images provide information related to the local formation environment penetrated by the borehole. Both information types are useful information for hydrocarbon prospecting. Dip information extracted from borehole images, however, is usually of higher accuracy than that extracted from seismic maps.

Various well logging techniques are known in the field of hydrocarbon exploration and production for evaluating the subsurface formation penetrated by a borehole. These techniques typically use instruments or tools equipped with sources adapted to emit energy into the formation. In this description, "instrument" and "tool" will be used interchangeably to indicate, for example, an electromagnetic instrument (or tool), a wire-line tool (or instrument), or a logging-while-drilling tool (or instrument). The emitted energy interacts with the surrounding formation to produce signals that are then detected and measured by one or more sensors. By processing the detected signal data, an image or profile of the formation properties is obtained.

Commercial tools presently offered for producing electrical borehole images include the GeoVision Resistivity (GVR) tool and the Azimuthal Density Neutron (ADN) tool (both "while drilling" tools) and the Formation Microresistivity Imager (FMI) tool (a wireline tool), all owned and offered through logging services by Schlumberger, the assignee of the present invention. Dips are extracted from borehole images by identifying bed boundary interfaces on the image or by determining correlations between images measured at different sensors. The accuracy of the dip estimate from images is affected by many factors including the quality of the images, the vertical resolution of the tool, the skills of the geologist, and—in deviated wells—the accuracy of the borehole survey.

Among the above-mentioned imaging tools, the FMI tool provides the highest quality wellbore images due to its employment of measurement electrodes having small sizes (e.g., 0.2-inches). The accuracy of the apparent dip from the FMI tool's images is typically around 0.5° for typical high dip angles (or dip heights). For lower apparent dip, the accuracy degrades to several degrees. Furthermore, the FMI tool and other electrode tools work only in conductive mud.

The GVR tool provides real-time dip services, but only for apparent dips larger than 53°. Analysis of the obtained real-time image at the surface can remove this restriction, but since the image is acquired using one-inch electrode buttons, the quality of the image does not permit accurate determination of dip when relative dip is low. The fast rate of penetration can also affect the image quality and thus dip accuracy from the image. Like the FMI tool, the GVR tool works only in conductive mud.

For oil-based and synthetic muds, the Oil Base MicroImager (OBMI) tool, also by Schlumberger, may be used to provide image services. The quality of the image is poorer than that of the FMI tool, and the error on determined dips will be larger than that of the FMI tool. Currently, no electric image tools provide dip services in both conductive and insulating mud.

Electromagnetic (EM) induction and propagation logging are well-known techniques. The logging instruments are disposed within a borehole on a wireline or via a drill string "while drilling" to measure the electrical conductivity (or its inverse, resistivity) of earth formations surrounding the borehole. In the present description, any reference to conductivity is intended to encompass its inverse, resistivity, or vice versa. A typical electromagnetic resistivity tool comprises a transmitter antenna and one or more (typically a pair) receiver antennas disposed at a distance from the transmitter antenna along the axis of the tool (see FIG. 1).

Induction tools measure the resistivity (or conductivity) of the formation by measuring the voltage induced in the receiver antenna(s) as a result of magnetic flux induced by AC currents flowing through the emitting (or transmitter) antenna. So-called propagation tools operate in a similar fashion, but typically at higher frequencies than do induction tools for comparable antenna spacings (about $10^6$ Hz for propagation tools as compared with about $10^4$ Hz for the induction tools). A typical propagation tool may operate at a frequency range of 1 kHz –2 MHz.

Conventional transmitters and receivers are antennas formed from coils comprised of one or more turns of insulated conductor wire wound around a support. These antennas are typically operable as sources and/or receivers. Those skilled in the art will appreciate that the same antenna may be used as a transmitter at one time and as a receiver at another. It will also be appreciated that the transmitter-receiver configurations disclosed herein are interchangeable due to the principle of reciprocity, i.e., the "transmitter" may be used as a "receiver," and vice-versa.

The antennas operate on the principle that a coil carrying an AC current (e.g., a transmitter coil) generates a magnetic field. The electromagnetic energy from the transmitter antenna of a logging tool disposed in a borehole is transmitted into the surrounding regions of the formation, and this transmission induces an eddy current flowing in the formation around the transmitter (see FIG. 2A). The eddy current induced in the formation, which is a function of the formation's resistivity, generates a magnetic field that in turn induces an electrical voltage in the receiver antennas. If a pair of spaced-apart receivers is used, the induced voltages in the two receiver antennas would have different phases and amplitudes due to geometric spreading and absorption by the surrounding formation. The phase difference (phase shift, Φ)

and amplitude ratio (attenuation, A) from the two receivers can be used to derive the resistivity of the formation. The detected phase shift (Φ) and attenuation (A) depend on not only the spacing between the two receivers and the distances between the transmitter and the receivers, but also the frequency of EM waves generated by the transmitter.

In conventional induction and propagation logging instruments, the transmitter and receiver antennas are mounted with their axes along the longitudinal axis of the instrument. Thus, these tools are implemented with antennas having longitudinal magnetic dipole-moments (LMD). FIG. 2A presents a simplified representation of electromagnetic (EM) energy flowing from such a logging instrument disposed in a borehole portion or segment that penetrates a subsurface formation in a direction perpendicular to a formation bed of interest. This is not, however, an accurate depiction of all the numerous segments that make up a borehole—particularly when the borehole has been directionally-drilled as described below. Thus, segments of a borehole often penetrate formation layers at an angle other than 90 degrees, as shown in FIG. 2B. When this happens, the formation plane is said to have a relative dip. A relative dip angle, θ, is defined as the angle between the borehole axis (tool axis) BA and the normal N to the plane P of a formation bed of interest.

It is well known that the response of a logging tool will be affected by the formation bedding structures surrounding the segment of the borehole in which the tool is disposed. For electromagnetic logging tools, this is known as the shoulder bed effect. Accordingly, the responses of conventional induction and propagation tools having LMD antennas are affected by the formation bedding and its dips. However, such tools are inherently non-directional and, therefore, are incapable of providing azimuthal information about the bedding structure. Thus, commercially available wireline induction and LWD propagation resistivity tools are presently unable to accurately determine dip.

An emerging technique in the field of well logging is the use of instruments including antennas having tilted or transverse coils, i.e., where the coil's axis is not parallel to the longitudinal axis of the tool or borehole. These instruments are thus implemented with a transverse or tilted magnetic dipole-moment (TMD) antenna.

Those skilled in the art will appreciate that various ways are available to tilt or skew an antenna. Logging instruments equipped with TMD antennas are described, e.g., in: U.S. Pat. Nos. 6,163,155; 6,147,496; 5,115,198; 4,319,191; 5,508,616; 5,757,191; 5,781,436; 6,044,325; and 6,147,496. The response of such tools will depend on the azimuthal orientation of the tool in a dipping formation. Therefore, useful information about earth structure, in particular the dip and strike, can be obtained from a proper analysis of azimuthal or directional measurements.

U.S. Patent Application Publication No. 2003/0055565 to Omeragic, presently assigned to Schlumberger, derives closed-form expressions for the calculation of anisotropic formation parameters from tri-axial induction measurements. U.S. Pat. No. 6,163,155 to Bittar, assigned to Dresser, discloses a method and apparatus for simultaneously determining the horizontal resistivity, vertical resistivity, and relative dip angle for anisotropic earth formations by software rotation of orthogonal coils to achieve decoupling between the horizontal and vertical resistivity. U.S. Pat. No. 6,556,016 to Gao et al, assigned to Halliburton, discloses an induction method for determining approximate dip angle of anisotropic earth formation utilizing tri-axial measurements. These applications are limited to formations with anisotropy.

Definitions

Certain terms are defined throughout this description as they are first used, while certain other terms used in this description are defined below:

"Apparent dip" means the angle that a (dipping) bed makes a horizontal plane, as measured in any direction other than perpendicular to the strike.

"Bed" or "Bedding" means the stratification or layering of sediment or deposits that typically occurs in subsurface formations (which are typically rock).

"Binning" means the sorting of measured waveforms— particularly formation responses to transmitted electromagnetic energy—into groups based on values of parameters, and can be performed for one parameter determined from the waveform or for several parameters. An example of a binning criterion can be frequency or period of a component of the waveform. Another example is the association of the measured waveform with the azimuthal angle of the tool orientation.

"Dip" or "dip angle" means the angle that a (dipping) bed makes with a horizontal plane, as measured perpendicular to the strike.

"Inversion" or "invert" means deriving a model (a.k.a. "inversion model") from measured data (e.g., logging data) that produces responses most consistent with the measured data according to certain criteria As an example, a measured waveform can be used to construct the best subsurface formation model which produces responses that best fits the measurement through iteratively adjusting the model parameters.

"Relative dip" or "relative dip angle" means the angle between the borehole axis (or tool axis) and the normal direction to a plane defined by a formation bed of interest.

"Symmetry" or "symmetric," as used herein, refers to a configuration in which sets of transmitter-receiver arrangements are provided in opposite orientations along the longitudinal axis of a tool (e.g., θ, 180°-θ), such that these transmitter-receiver sets can be correlated with a standard symmetry operation (e.g., translation, mirror plane, inversion, and rotation) with respect to a point on the tool axis or a symmetry plane perpendicular to the tool axis. Symmetrization refers to a procedure in which responses of symmetric partners are added or subtracted to generate a combined response.

"Toolface" refers to the angular orientation of an instrument about its longitudinal axis, and represents an angle subtended between a selected reference on the instrument's housing (e.g., a drill collar) and either the gravitationally uppermost wall of the wellbore or geographic north.

SUMMARY OF THE INVENTION

In one aspect, the present invention provides a method and apparatus to determine the dip and strike of an earth formation based on directional (i.e., azimuthal) measurements. The measurements are relatively deep so the effects of the borehole environment, compared with conventional borehole imagers, are much less significant. Another advantage is that the invention works in both conductive and resistive mud. The accuracy of the dip determination can be quite high, especially when the relative dip is not close to 90°.

The present invention uses directional measurements of a electromagnetic (EM) wave tool to derive the dip and strike of the formation bedding. The azimuth angle can be determined by examining the directional response of as a function of azimuthal angle, either through a true tool rotation, or through software rotation with a set of tri-axial coils in the case of wireline (see, e.g., U.S. Pat. No. 6,584,408). The dip information is derived from the response of symmetrized directional measurements and can be applied while drilling so as to provide real-time dip services, but without the restriction of a high relative dip requirement as in the case of known tools.

The present invention is based on the discovery that in almost all dip angles, the symmetrized directional response (xz-zx induction or its propagation counterpart) is nearly linearly proportional to the relative dip angle for a given earth formation. In addition, when the receiver and transmitter are located on different sides of the bed boundary the proportionality factor is nearly constant and independent of tool position. Such remarkable properties are only true for the symmetrized measurements.

Thus, one aspect of the present invention relates to the apparatus required to make such symmetrized measurements. It involves a symmetrized TR or TRR pairs of measurements, as proposed by U.S. Patent Application Publication No. 2003/0085707 to Minerbo et al, presently assigned to Schlumberger. The measurements are made from induction to propagation frequency.

Another aspect of the present invention relates to a method for using the response of such an apparatus to accurately derive both the relative dip and azimuth of the bedding. The true dip and azimuth can be computed from the relative dip and azimuth information coupled with borehole orientation.

Another aspect of the present invention relates to the application of such dip service in real-time while drilling.

A further aspect of the present invention relates to the use of such information in aiding the interpretation of resistivity anisotropy for tri-axial induction or propagation tools.

The advantage of such dip determination over the conventional borehole image-derived dips include:
1. high accuracy at lower relative dip angles;
2. real-time availability of dip determination services;
3. less borehole-environment dependence, and freedom of borehole mud cake and mud/filtrate effects;
4. dip determination not affected by slight variations of local dip angle adjacent to borehole wall;
5. dip services independent of mud type.

Thus, the invention may be expressed more particularly as a method for characterizing a subsurface formation with a logging instrument disposed in a borehole penetrating the formation, with the logging instrument having a longitudinal axis and being equipped with at least a transmitter system and a receiver system. The logging instrument is positioned within the borehole so that the transmitter system and receiver system are disposed in the vicinity of a formation boundary of interest, and the azimuthal orientation of the logging instrument is measured. Electromagnetic energy is transmitted into the formation using the transmitter system, and signals associated with the electromagnetic energy transmitted by the transmitter system using are measured using the receiver system. The relative azimuth of the formation boundary is determined, and a symmetrized directional measurement is composed using the measured signals and the determined relative boundary azimuth. The relative dip of the formation boundary is then determined using the composed directional measurement.

The relative azimuth and relative dip of the formation boundary may then be used to determine the true azimuth and dip of the formation boundary, in a manner that is known in the art.

In one embodiment of the inventive method, the logging instrument is carried within a drill string for rotation therewith. This embodiment employs a transmitter system that includes first and second transmitter antennas, and a receiver system that includes first and second receiver antennas. The second transmitter antenna has a magnetic dipole-moment whose tilt corresponds to the tilt of the first receiver antenna's magnetic dipole-moment, and the second receiver antenna has a magnetic dipole-moment whose tilt corresponds to the tilt of the first transmitter antenna's magnetic dipole-moment. At least one of the first antennas has a tilted magnetic dipole-moment with respect to the axis of the logging instrument, with the tilted magnetic dipole-moment of the one first antenna corresponding to a first azimuthal angle. Additionally, at least one of the second antennas has a tilted magnetic dipole-moment with respect to the axis of the logging instrument, the tilted magnetic dipole-moment of the one second antenna corresponding to a second azimuthal angle. This embodiment is adaptable to variations between the first and second azimuthal angles. Thus, for example, the second azimuthal angle may differ from the first azimuthal angle by substantially 90 degrees, or the two angles may be substantially equal.

In another drill string application, the transmitter system includes at least one antenna having a magnetic dipole-moment that is tilted with respect to the axis of the logging instrument by an angle $\theta$, and the receiver system includes at least one antenna having a magnetic dipole-moment that is tilted with respect to the axis of the logging instrument by an angle $180-\theta$. In this case, the transmitting step and the measuring steps are conducted while the logging instrument is being rotated with the drill string.

In this drill string application, the transmitter system may include two spaced-apart transmitter antennas, with each transmitter antenna having a magnetic dipole-moment that is tilted with respect to the instrument axis by a first angle. The receiver system may include at least one receiver antenna positioned between the two transmitter antennas at a first borehole depth, with the receiver antenna having a magnetic dipole-moment that is tilted with respect to the instrument axis by a second angle. In this case, the transmitting step includes energizing one of the two transmitter antennas so as to transmit electromagnetic energy into the formation, while the measuring step includes measuring first voltage signals associated with the electromagnetic energy transmitted by the one transmitter antenna (using the receiver antenna), determining the azimuthal orientation of the logging instrument, and rotating the drill string so as to rotate the transmitter and receiver antennas about the axis of the logging instrument. The logging instrument is the moved within the borehole so as to position the other of the two transmitter antennas to the first borehole depth, and the other of the two transmitter antennas is energized so as to transmit electromagnetic energy into the formation. Second voltage signals associated with the electromagnetic energy transmitted by the other transmitter antenna are then measured using the receiver antenna, the azimuthal orientation of the logging instrument is again determined, and the drill string is again rotated so as to rotate the transmitter and receiver antennas about the axis of the logging instrument. The relative boundary azimuth may then be determined from the measured first and second voltage signals, and the measured first and second voltage signals can then be combined to compose the symmetrized directional measurement.

In the drill string applications of the inventive method, the azimuth of the logging instrument may be determined using a tool face sensor. The relative boundary azimuth may be determined using binning, or by referencing the measured azimuthal angles corresponding to the minimum and maximum magnitudes among the measured signals.

It is preferred that the measured signals are complex voltage signals. Accordingly, relevant phase-shift and attenuation values can be calculated from the measured voltage signals associated with the relative boundary azimuth. The phase-shift and attenuation values may be obtained by taking the logarithm of the ratio of the complex voltage signals obtained from two distinct preselected azimuthal angles, such as 0 and 180 degrees from the determined relative boundary azimuth.

In a particular embodiment of the inventive method, the directional measurement-composing step includes extracting both the magnitude and the phase of the measured signals by fitting the response of the measured signals at different instrument azimuthal orientations to approximate functions. The fitting functions are preferably sinusoids having fitting coefficients that include constant, $\sin \theta$, $\cos \theta$, $\sin 2\phi$ and $\cos 2\phi$ terms that define an iterative fitting algorithm useful for determining the azimuthal dependence of the directional measurements, as described in copending U.S. patent application Ser. No. 10/709,212, filed on Apr. 21, 2004, by Li et al. and assigned to the assignee of the present invention.

In a particular embodiment of the inventive method, the transmitter system includes at least first and second transmitter antennas, and the receiver system includes at least first and second receiver antennas. The antennas are oriented such that the first transmitter and first receiver antennas define a first symmetric antenna pair, and the second transmitter and second receiver antennas define a second symmetric antenna pair, with the magnetic dipole-moment of at least one of the antennas forming a substantially nonzero angle with the logging instrument.

The inventive method preferably further includes the step of determining the resistivity profile across the formation boundary, which may or may not be considered part of the dip-determining step. The resistivity profile may be determined from known pilot hole data or from downhole resistivity measurements. The downhole resistivity measurements are typically provided by the logging instrument or by another tool conveyed in a common tool string with the logging instrument.

The relative dip-determining step may include using a precalculated look-up table for directional measurements for selected values of the resistivity of two formation beds divided by the formation boundary and the relative dip angle. By determining the actual resistivity values of the two formation beds, one or more precalculated look-up tables for the selected pair of resistivities may be used to determine the boundary directional-response per unit dip corresponding to the actual resistivity values. The relative dip is then determined by dividing the composed directional measurement by a scaling factor, which is determined from the determined resistivity profile by calculating the boundary directional response per unit dip.

The relative dip-determining step may further include an inversion. On example includes the steps of selecting one or more directional measurements to be used in the inversion, selecting an appropriate inversion model, verifying that the selected inversion model is consistent with other information, and determining the relative dip and selected inversion model parameters. The determined, selected inversion model parameters may include the position of the formation boundary, and resistivities of the formation beds on either side of the boundary. The inversion model selection step includes selecting the simplest model that fits the known information, and the verifying step includes comparing the selected model to known geological characteristics and other measured formation parameters.

In another application of the inventive method, the logging instrument is a non-rotating or slowly rotating wireline or drill string-conveyed tool. In a particular embodiment according to this case, the transmitter system includes two transmitter antennas and each transmitter antenna has a magnetic dipole-moment aligned with the instrument axis (see FIG. 5A). The receiver system includes two transverse receiver antennas R1, R2 with their magnetic dipole-moments oriented at different orientations, but both perpendicular to the axis of the logging instrument. The two receiver antennas R1, R2 are positioned between the two transmitter antennas T1, T2 at a first borehole depth substantially midway between the two transmitter antennas T1, T2.

In another embodiment of the non- or slowly-rotating instrument, the receiver system includes a receiver antenna having a magnetic dipole-moment aligned with the instrument axis, and the transmitter system includes two transverse transmitter antenna pairs (T1, T1'; T2, T2') with the magnetic dipole-moments of each pair being oriented at different orientations but both being perpendicular to the axis of the logging instrument (see FIG. 5B). The receiver antenna is positioned between the two transmitter antenna pairs T1, T2 at a first borehole depth substantially midway between the two transmitter antenna pairs T1, T2.

Since instrument rotation is not available in such applications, a software-composed rotation matrix is employed, in accordance with the teachings of U.S. Pat. No. 6,584,408, also assigned to the assignee of the present invention are employed 35. In such non- or slowly-rotating applications of the inventive method, the transmitting step includes energizing one of the two transmitter antennas so as to transmit electromagnetic energy into the formation. The measuring step includes using the two receiver antennas to measure first voltage signals associated with the electromagnetic energy transmitted by the one transmitter antenna, measuring the azimuth of the logging instrument, determining the relative boundary azimuth, and composing a first directional measured voltage signal of a virtual transverse receiver at the relative boundary azimuth using a rotation matrix corresponding to the determined relative boundary azimuth with respect to the instrument azimuth. The logging instrument is then moved within the borehole so as to move the other of the two transmitter antennas to the first borehole depth (where the two receiver antennas were positioned), and the process is repeated. Thus, the other of the two transmitter antennas are energized so as to transmit electromagnetic energy into the formation, the two receivers are used to measure second voltage signals associated with the electromagnetic energy transmitted by the other transmitter antenna, the azimuth of the logging instrument is (again) measured, the relative boundary azimuth is (again) determined. These steps permit the composition of a second directional measured voltage signal of a virtual transverse receiver at the relative boundary azimuth using a rotation matrix corresponding to the determined relative boundary azimuth with respect to the instrument azimuth. The composed first and second voltage signals of the virtual transverse receiver are then combined to compose the symmetrized directional measurement.

In particular embodiments of the non- or slowly-rotating applications, the transmitter system includes tri-axial transmitter antennas $T_n$, and the receiver system includes tri-axial receiver antennas $R_n$ (see FIG. 5C). The magnetic dipole-moment vectors of the three antennas in the antenna systems may be linearly independent (FIG. 5C) or mutually orthogonal (FIG. 5D). The tri-axial antennas may also be substantially colocated (see FIG. 5E). In embodiments employing tri-axial antennas, the transmitting step includes sequentially energizing each of the three transmitter antennas so as to transmit electromagnetic energy into the formation.

In the case of mutually orthogonal tri-axial antenna systems, the measuring step includes sequentially measuring first, second, and third voltage signals associated with the electromagnetic energy transmitted by the first, second, and third transmitter antenna, using the three receiver antennas for each measurement. The voltage signals measured by the respective three receivers are then linearly combined to generate voltages representing virtual transmitter and receiver pairs of arbitrary orientations. This enables the composition of coupling voltages between three mutually orthogonal virtual transmitters and receivers, and the composition of the symmetrized directional measurement using the coupling voltages for symmetric transmitter and receiver pairs.

The relative boundary azimuth may be determined in such embodiments according to:

$\tan^{-1}(YZ/XZ)$ or $\tan^{-1}(2*XY/(XX-YY))$, where:

YZ is the voltage of the Y-oriented receiver and Z-oriented transmitter antennas of unit magnetic dipole-moment, XZ is the voltage of the X-oriented receiver and Z-oriented transmitter antennas of unit magnetic dipole-moment, XY is the voltage of the X-oriented receiver and Y-oriented transmitter antennas of unit magnetic dipole-moment, XX is the voltage of the X-oriented receiver and X-oriented transmitter antennas of unit magnetic dipole-moment, YY is the voltage of the Y-oriented receiver and Y-oriented transmitter antennas of unit magnetic dipole-moment, Z is in direction along the instrument axis, X is in the direction of the reference azimuth angle, and perpendicular to Z, Y is perpendicular to X and Z; and X-Y-Z forms a Cartesian coordinate system.

The directional measurements according to such embodiment may be composed using an X'Z-ZX' coupling voltage, where X' is in the direction of the relative boundary azimuth and is perpendicular to the instrument axis Z.

In the case of linearly-independent tri-axial antenna systems, the signals of virtual transmitter-receiver pairs of a fixed orientation are generated from the measured first, second, and third voltage signals through a 3D-space rotation matrix corresponding to the fixed orientation.

Another aspect of the present invention relates to a method for characterizing a subsurface formation, including the steps of positioning a logging instrument within a borehole so that the instrument's transmitter system and receiver system are disposed in the vicinity of a formation boundary of interest, and measuring the azimuthal orientation of the logging instrument. Electromagnetic energy is transmitted into the formation using the transmitter system, and signals associated with the electromagnetic energy transmitted by the transmitter system are measured using the receiver system. A symmetrized directional measurement is composed using the measured signals, and the determined directional measurement is plotted as a function of depth for a plurality of different depths. The depth at which at least one of the upper and lower antennas crosses the formation boundary may then be identified using a discontinuity in the rate of the change in the directional measurement.

Another aspect of the present invention relates to a logging apparatus for characterizing a subsurface formation penetrated by a borehole, including a body adapted for conveyance in the borehole and having a longitudinal axis. The body of the logging apparatus may be adapted for conveyance and rotation within a drill string, and for conveyance with a wireline. A transmitter system is carried by the body for transmitting electromagnetic energy into the formation. A receiver system is carried by the body for measuring signals associated with the electromagnetic energy transmitted by the transmitter system. Means are also provided for determining the relative azimuth of a formation boundary of interest in the vicinity of the borehole, for composing a symmetrized directional measurement using signals measured by the receiver system and the relative boundary azimuth determined by the azimuth-determining means, and for determining the relative dip of the formation boundary using the composed directional measurement.

In a particular embodiment of the inventive apparatus, the transmitter system includes at least one antenna having a magnetic dipole-moment that is tilted with respect to the axis of the logging instrument by an angle θ, and the receiver system includes at least one antenna having a magnetic dipole-moment that is tilted with respect to the axis of the logging instrument by an angle 180-θ.

In a further embodiment of the inventive apparatus, the transmitter system includes at least first and second transmitter antennas, and the receiver system includes at least first and second receiver antennas. The antennas are oriented such that the first transmitter and first receiver antennas define a first symmetric antenna pair, and the second transmitter and second receiver antennas define a second symmetric antenna pair.

In a further embodiment of the inventive apparatus, the transmitter system includes two transmitter antennas, with each transmitter antenna having a magnetic dipole-moment aligned with the instrument axis. The receiver system includes two transverse, mutually orthogonal receiver antennas, with the two receiver antennas being positioned between the two transmitter antennas. Alternatively, the apparatus may be configures with reciprocal receivers and transmitters (two transmitter antennas being positioned between the two receiver antennas).

In a particular embodiment, the transmitter system includes tri-axial transmitter antennas, and the receiver system includes tri-axial receiver antennas.

The azimuth-determining means may include a tool face sensor, and/or a computer-readable medium having computer-executable instructions for determining the relative azimuth of the formation boundary of interest.

The composing means includes, in one embodiment, a computer-readable medium having computer-executable instructions for composing a symmetrized directional measurement using signals measured by the receiver system and the relative boundary azimuth determined by the azimuth-determining means.

The relative dip-determining means may include a computer-readable medium having computer-executable instructions for determining the relative dip of the formation boundary using the composed directional measurement.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows schematic diagrams of prior art induction or propagation tools.

FIGS. 2A and 2B are elevational views showing eddy currents induced by a logging tool in a borehole penetrating a formation without and with a relative dip, respectively.

FIG. 4 is a schematic representation of a basic directional measurement logging tool having symmetrical transmitter and receiver antenna pairs.

FIG. 5 is a schematic representation of a directional measurement logging tool disposed in a borehole segment that lies within a single formation bed, whereby symmetrized directional measurements are designed to be insensitive to dip a and anisotropy.

FIG. 14 shows the equivalent induction tool response for a symmetrized TR pair (XZ-ZX measurement), normalized by dip angle.

DETAILED DESCRIPTION OF THE INVENTION

Figure 3:
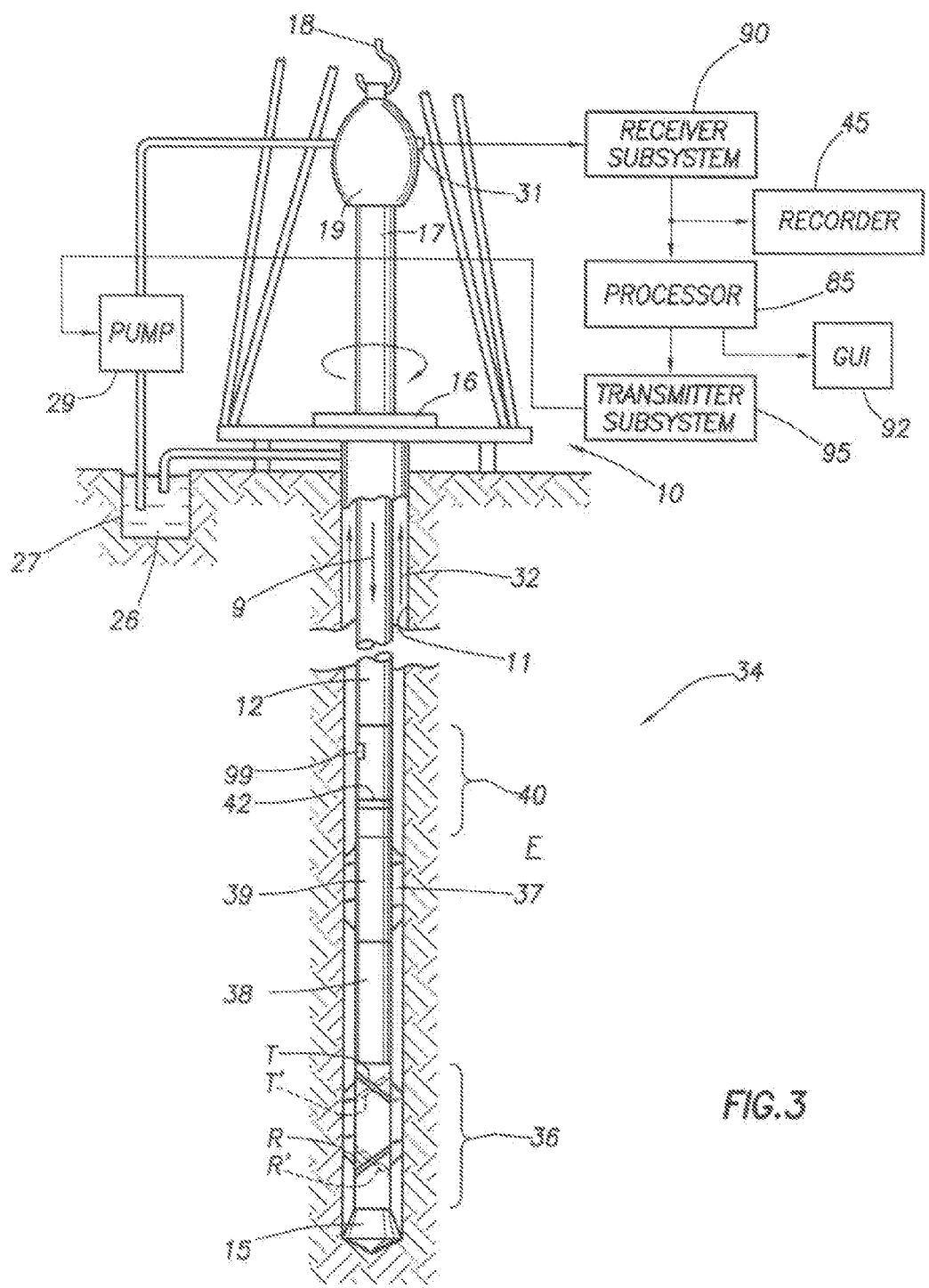
FIG. 3 is an elevational representation of a conventional rotary drilling string in which the present invention may be employed to advantage.
Figure 5A:
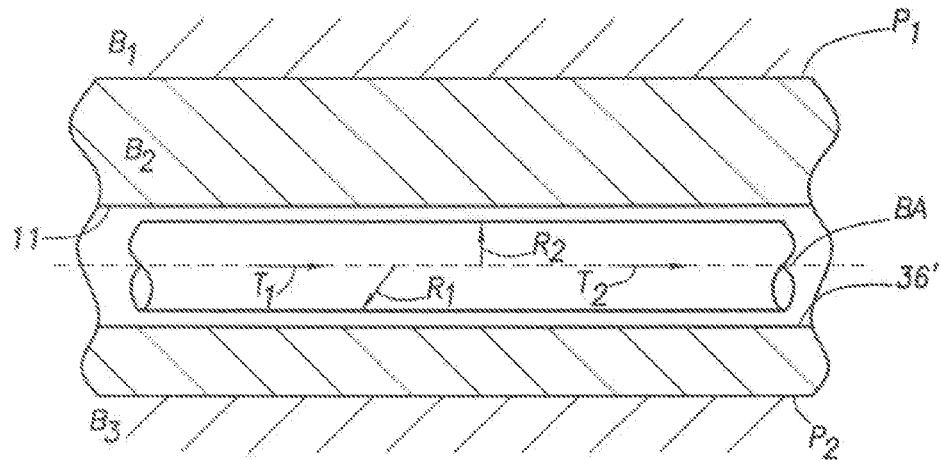
FIG. 5A is a simplified illustration representing an alternative directional measurement logging tool as in FIG. 5, wherein the transmitter has two transmitter antennas and the receiver system has two receiver antennas which are positioned substantially midway between the two transmitter antennas.
Figure 5B:
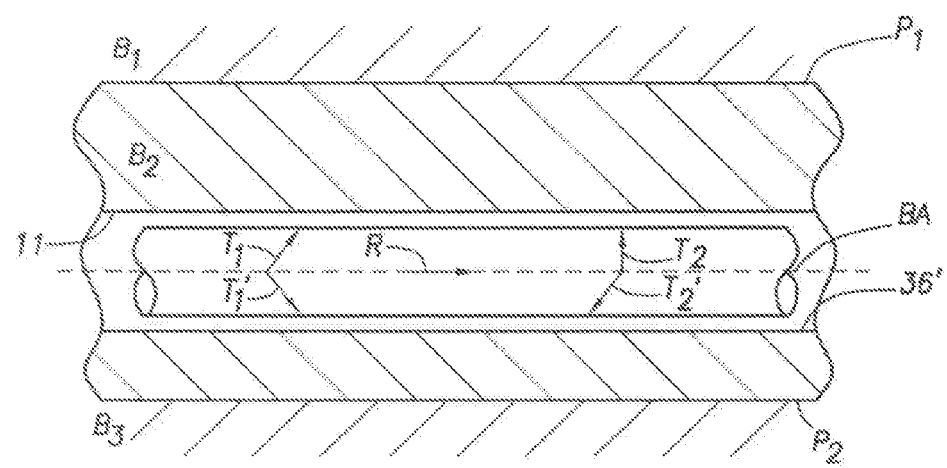
FIG. 5B is a simplified illustration representing an alternative directional measurement logging tool, wherein a receiver antenna having a magnetic-dipole moment aligned with the instrument axis is positioned between two transverse transmitter antenna pairs.
Figure 5C:
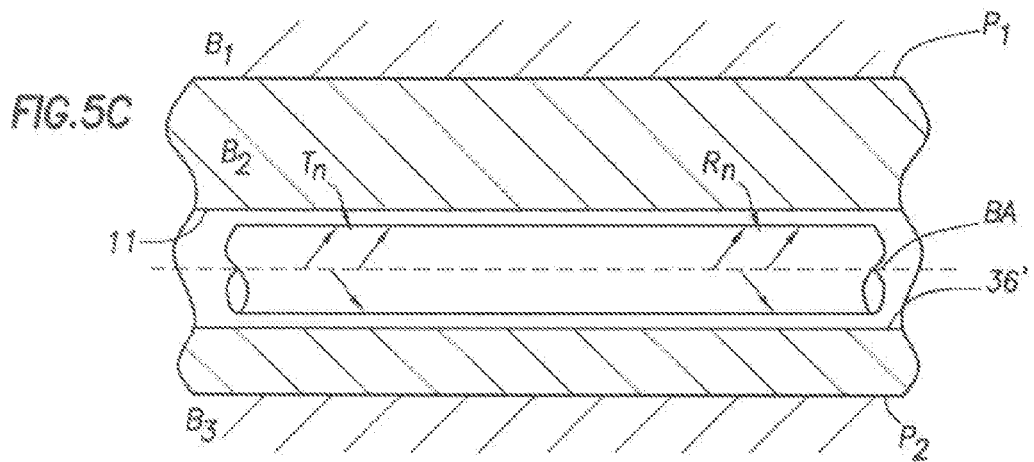
FIG. 5C is a simplified illustration representing an alternative directional measurement logging tool, wherein the transmitter system has tri-axial transmitter antennas and the receiver system has three tri-axial receiver antennas.
Figure 5D:
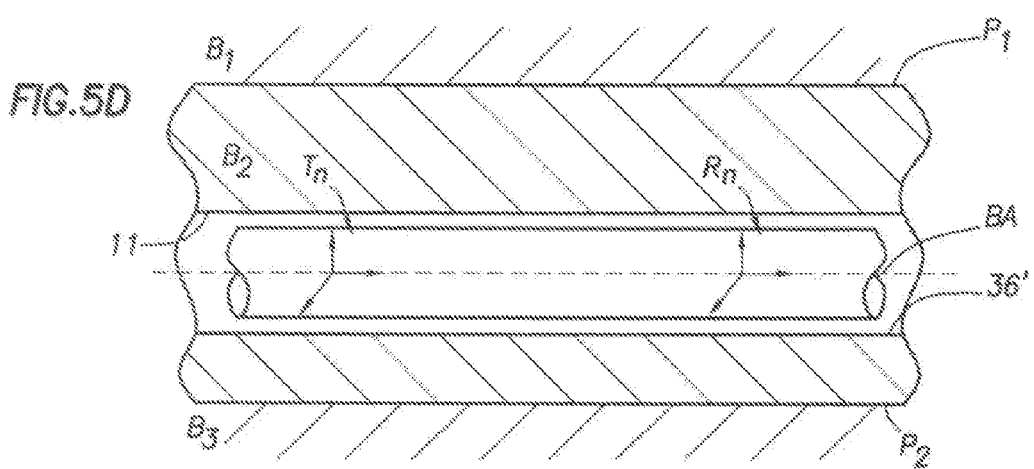
FIG. 5D is a simplified illustration representing an alternative directional measurement logging tool, wherein the transmitter system has substantially co-located, tri-axial transmitter antennas and the receiver system has substantially co-located, tri-axial receiver antennas, and wherein the magnetic-dipole moment vectors of the transmitter antennas and the receiver antennas are mutually orthogonal.
Figure 5E:
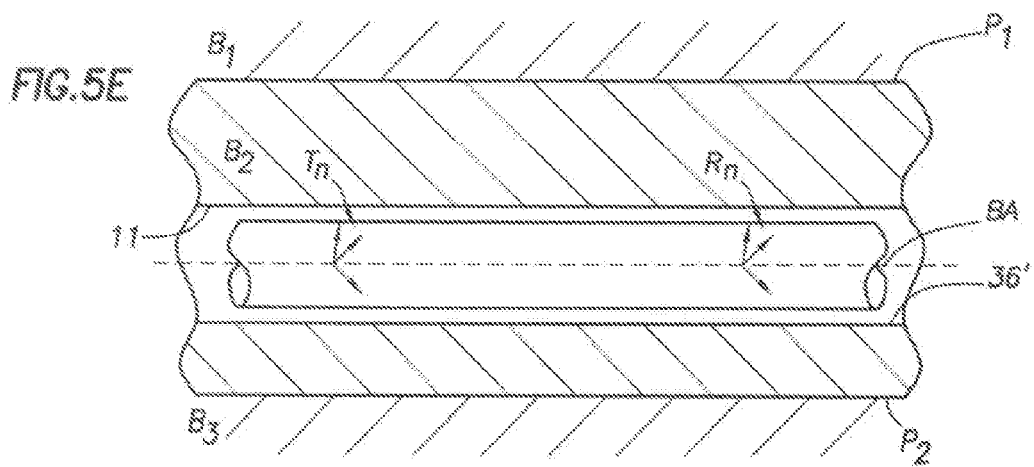
FIG. 5E is a simplified illustration representing an alternative directional measurement tool, wherein the transmitter system has substantially co-located tri-axial transmitter antennas and the receiver system has substantially co-located tri-axial receiver antennas.

FIG. 3 illustrates a conventional drilling rig and drill string in which the present invention can be utilized to advantage. A land-based platform and derrick assembly 10 are positioned over a wellbore 11 penetrating a subsurface formation F. In the illustrated embodiment, the wellbore 11 is formed by rotary drilling in a manner that is well known. Those of ordinary skill in the art given the benefit of this disclosure will appreciate, however, that the present invention also finds application in directional drilling applications as well as rotary drilling, and is not limited to land-based rigs. It will further be appreciated that the present invention is not limited to "while-drilling" applications, but also has utility in wireline applications (as described further below).

A drill string 12 is suspended within the wellbore 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the wellbore, called the annulus, as indicated by the direction arrows 32. In this manner, the drilling fluid lubricates the drill bit 15 and carries formation cuttings up to the surface as it is returned to the pit 27 for recirculation.

The drill string 12 further includes a bottomhole assembly, generally referred to as 34, near the drill bit 15 (in other words, within several drill collar lengths from the drill bit). The bottomhole assembly includes capabilities for measuring, processing, and storing information, as well as communicating with the surface. The bottomhole assembly 34 thus includes, among other things, a measuring and local communications apparatus 36 for determining and communicating the resistivity of the formation F surrounding the wellbore 11. The communications apparatus 36, also known as a resistivity tool, includes a first pair of transmitting/receiving antennas T, R, as well as a second pair of transmitting/receiving antennas T', R'. The second pair of antennas T', R' are symmetric with respect to the first pair of antennas T, R, as is described herein. The resistivity tool 36 further includes a controller to control the acquisition of data, as is known in the art.

The BHA 34 further includes instruments housed within drill collars 38, 39 for performing various other measurement functions, such as measurement of the natural radiation, density (gamma ray or neutron), and pore pressure of the formation F. At least some of the drill collars are equipped with stabilizers 37, as are well known in the art.

A surface/local communications subassembly 40 is also included in the BHA 34, just above the drill collar 39. The subassembly 40 includes a toroidal antenna 42 used for local communication with the resistivity tool 36 (although other known local-communication means may be employed to advantage), and a known type of acoustic telemetry system that communicates with a similar system (not shown) at the earth's surface via signals carried in the drilling fluid or mud. Thus, the telemetry system in the subassembly 40 includes an acoustic transmitter that generates an acoustic signal in the drilling fluid (a.k.a., "mud-pulse") that is representative of measured downhole parameters.

The generated acoustical signal is received at the surface by transducers represented by reference numeral 31. The transducers, for example, piezoelectric transducers, convert the received acoustical signals to electronic signals. The output of the transducers 31 is coupled to an uphole receiving subsystem 90, which demodulates the transmitted signals. The output of the receiving subsystem 90 is then coupled to a computer processor 85 and a recorder 45. The processor 85 may be used to determine the formation resistivity profile (among other things) on a "real time" basis while logging or subsequently by accessing the recorded data from the recorder 45. The computer processor is coupled to a monitor 92 that employs a graphical user interface ("GUI") through which the measured downhole parameters and particular results derived therefrom (e.g., resistivity profiles) are graphically presented to a user.

An uphole transmitting system 95 is also provided for receiving input commands from the user (e.g., via the GUI in monitor 92), and is operative to selectively interrupt the operation of the pump 29 in a manner that is detectable by transducers 99 in the subassembly 40. In this manner, there is two-way communication between the subassembly 40 and the uphole equipment. A suitable subassembly 40 is described in greater detail in U.S. Pat. Nos. 5,235,285 and 5,517,464, both of which are assigned to the assignee of the present invention. Those skilled in the art will appreciate that alternative acoustic techniques, as well as other telemetry means (e.g., electromechanical, electromagnetic), can be employed for communication with the surface.

Two types of coil antennas are used to compose measurements with directional sensitivity. One type achieves its directional sensitivity by having the antenna either offset, e.g., from the center of a logging tool's longitudinal axis, or partially covered. Directional measurements can also be made with at least one antenna configured so that its magnetic dipole-moment is not aligned with the longitudinal axis of the tool carrying the antenna. The present invention relates to the second type of directionally-sensitive antenna.

FIG. 4 schematically illustrates a basic resistivity tool 36 for directional electromagnetic (EM) wave measurement. The tool 36 includes a transmitter antenna T that fires an EM wave of some frequency f and a receiver antenna R that is some distance L away. Also shown is the symmetric pair (T', R') in accordance with the teachings of U.S. Patent Application Publication No. 20003/0085707 ("Minerbo et al") assigned to the assignee of the present invention. For clarity and simplification, the discussion that follows will be limited to the transmitter antenna T and the receiver antenna R, although it is generally applicable to the symmetric antenna pair, T' and R'. It should be noted that although the tiled dipole-moment of the two symmetrization pairs are on the same plane in FIG. 4, this is not required in the current invention. As will be clear in the subsequent discussion, signals from two pairs that have their dipole-moment in different planes can still be added together to achieve equivalent results if the extracted coefficients or directional phase-shift or attenuation are used in the symmetrization operation.

In operation, the receiver antenna R will register a voltage $V_{RT}$ induced by the EM wave from the transmitter antenna T and its secondary currents produced in the formation penetrated by the borehole containing the logging tool 36. Both antennas T and R are fixed on the tool 36 and thus physically rotate with the tool. This is contrasted with the alternative wireline application of the present invention, wherein virtual antennas are "rotated" with software (i.e., the measured voltage signals are "rotated" about the axis of the logging instrument to a plane that is perpendicular to the boundary of interest using a rotation matrix corresponding to the determined boundary azimuth).

The tool 36 is equipped with a toolface sensor within one of the drill collars 38, 39 for continuously indicating the azimuthal orientation of the logging instrument, and a controller for controlling the first and second transmitter-receiver antenna pairs so as to selectively transmit electromagnetic energy into the formation and measure the voltage signals associated with the transmitted electromagnetic energy as a function of the azimuthal orientation of the logging instrument. The toolface sensor employs one of: magnetometers to indicate the azimuthal orientation of the logging instrument with respect to earth's magnetic north; gravitation sensors to indicate the azimuthal orientation of the logging instrument with respect to the earth's gravity vector; or other suitable means that are known in the art. The antenna orientations may be assumed to form angles $\theta_T$ for the transmitter antenna T, and $\theta_R$ for the receiver antenna R. The azimuthal variation of the coupling voltage as the tool rotates can then be expressed in terms of the coupling of Cartesian components of the magnetic dipole-moments as:

$$V_{RT}(\phi) = \left[V_{zz}\cos\theta_T\cos\theta_R + \frac{1}{2}(V_{xx} + V_{yy})\sin\theta_T\sin\theta_R\right] + \quad (1.1)$$

$$[V_{xz}\sin\theta_T\cos\theta_R V_{zx}\cos\theta_T\sin\theta_R]\cos\phi +$$

$$[V_{yz}\sin\theta_T\cos\theta_R + V_{zy}\cos\theta_T\sin\theta_R]\sin\phi +$$

$$\left[\frac{1}{2}(V_{yx} + V_{xy})\sin\theta_T\sin\theta_R\right]\sin2\phi +$$

$$\left[\frac{1}{2}(V_{xx} - V_{yy})\sin\theta_T\sin\theta_R\right]\cos2\phi$$

$$= C_0(\theta_T, \theta_R) + C_{1c}(\theta_T, \theta_R)\cos\phi +$$

$$C_{1s}(\theta_T, \theta_R)\sin\phi +$$

$$C_{2c}(\theta_T, \theta_R)\cos2\phi + C_{2s}(\theta_T, \theta_R)\sin2\phi$$

where a set of complex coefficients $C_0, C_{1c}, C_{1s}, C_{2c}, C_{2s}$ has been defined to represent the amplitudes of the different components of the measured formation response. The complex coefficients are thus defined as:

$$C_0(\theta_T, \theta_R) \equiv \left[V_{zz}\cos\theta_T\cos\theta_R + \frac{1}{2}(V_{xx} + V_{yy})\sin\theta_T\sin\theta_R\right] \quad (1.2)$$

$$C_{1c}(\theta_T, \theta_R) \equiv [V_{xz}\sin\theta_T\cos\theta_R + V_{zx}\cos\theta_T\sin\theta_R]$$

$$C_{1s}(\theta_T, \theta_R) \equiv [V_{yz}\sin\theta_T\cos\theta_R + V_{zy}\cos\theta_T\sin\theta_R]$$

$$C_{2c}(\theta_T, \theta_R) \equiv \left[\frac{1}{2}(V_{xx} - V_{yy})\sin\theta_T\sin\theta_R\right]$$

$$C_{2s}(\theta_T, \theta_R) \equiv \left[\frac{1}{2}(V_{yx} + V_{xy})\sin\theta_T\sin\theta_R\right]$$

According to one aspect of the present invention, it is recognized that these coefficients are functions of formation resistivity, borehole deviation, and azimuth angle at the tool location.

With a symmetrization operation, i.e., $(\theta_T \leftrightarrow \theta_R)$, Eq. (1.1) is simplified to:

$$\tilde{V}(\phi) \equiv V_{RT}(\phi, \theta_T, \theta_R) - V_{RT}(\phi, \theta_R, \theta_T) \quad (1.3)$$

$$= 2[V_{xz} - V_{zx}]\sin(\theta_T - \theta_R)\cos\phi +$$

$$2[V_{yz} - V_{zy}]\sin(\theta_T - \theta_R)\sin\phi$$

$$\equiv \tilde{C}_{1c}(\theta_T, \theta_R)\cos\phi + \tilde{C}_{1s}(\theta_T, \theta_R)\sin\phi$$

All the second-order harmonics ($C_{2c}$, $C_{2s}$) disappear after the subtraction because they are symmetric with respect to the exchange of transmitter and receiver tilt angles. Thus symmetrization simplifies azimuthal variation of the anti-symmetrized signal.

At this stage, the reference point of the azimuthal angle is arbitrary. For planner geometry, if we choose angle $\phi$ reference point as the direction projected by the normal vector of the bedding plane to the tool plane, then $V_{yz}=V_{zy}=0$ by symmetry and $\tilde{V}(\phi)$ would have a pure cos $\theta$ dependence. In actual application, the orientation of the bedding is unknown. However, given any reference, the bedding orientation can be calculated by:

$$\phi_{bed} = \tan^{-1}\left[\left|\frac{\tilde{C}_{1s}(\theta_T, \theta_R)}{\tilde{C}_{1c}(\theta_T, \theta_R)}\right|\right] = \tan^{-1}\left[\left|\frac{V_{yz} - V_{zy}}{V_{xz} - V_{zx}}\right|\right] \quad (1.4)$$

With rotation $\phi_{bed}$, $\tilde{x}$ will be normal to the bedding and thus $\tilde{V}(\phi)$ is exactly $[V_{xz} - V_{zx}]$ aside from a multiplication constant $2\sin(\theta_T - \theta_R)$.

Once the voltage at each of the receiver coils due to each of the transmitter coils is determined, the total measurement can be determined: by adding the voltages in the case of an induction tool; or by taking the complex ratio of the voltages in the case of a propagation tool. For example, for the propagation logging device of FIG. 4, the absolute value of the voltage at each receiver can be obtained as the square root of the sum of squares of the real and imaginary parts of the complex voltage (Eq. 1.1), and the ratio of the absolute values provides the attenuation, from which the attenuation-determined resistivity $R_{ad}$ can be obtained (resistivity of formations at a relatively deep depth of investigation around the receivers). The phase for each receiver is obtained from the arc-tangent of the ratio of the imaginary and real parts of the complex voltage, and the phase shift is the difference in phase at the two receivers. The phase-shift-determined resistivity $R_{ps}$ can then be obtained (resistivity of formations at a relatively shallow depth of investigation around the receivers).

For propagation-style measurements, the difference of the logarithmic of the voltages (or the ratio) between two measurements is taken. Following the teachings of Minerbo et al, we take the amplitude of the azimuthal response, i.e., the difference in phase-shift and attenuation of measurement, at angle $\phi$ and that at ($\phi$+180), evaluated at the maximum of the voltage response. This leads to approximately, from Eqs. (1.1–2):

$$\frac{V_{RT}(\phi)}{V_{RT}(180+\phi)} = \frac{\begin{array}{l}C_0(\theta_T, \theta_R) + C_{1c}(\theta_T, \theta_R)\cos\phi + \\ C_{1s}(\theta_T, \theta_R)\sin\phi + \\ C_{2c}(\theta_T, \theta_R)\cos 2\phi + C_{2s}(\theta_T, \theta_R)\sin 2\phi\end{array}}{\begin{array}{l}C_0(\theta_T, \theta_R) - C_{1c}(\theta_T, \theta_R)\cos\phi - \\ C_{1s}(\theta_T, \theta_R)\sin\phi + \\ C_{2c}(\theta_T, \theta_R)\cos 2\phi + C_{2s}(\theta_T, \theta_R)\sin 2\phi\end{array}} \quad (1.5)$$

$$\cong 1 + 2\frac{\begin{array}{l}C_0(\theta_T, \theta_R) + C_{1c}(\theta_T, \theta_R)\cos\phi + \\ C_{1s}(\theta_T, \theta_R)\sin\phi\end{array}}{\begin{array}{l}C_0(\theta_T, \theta_R) + C_{2c}(\theta_T, \theta_R)\cos 2\phi + \\ C_{2s}(\theta_T, \theta_R)\sin 2\phi\end{array}}$$

$$\cong 1 + 2\frac{\begin{array}{l}[V_{xz}\sin\theta_T\cos\theta_R + V_{zx}\cos\theta_T\sin\theta_R]\cos\phi + \\ [V_{yz}\sin\theta_T\cos\theta_R + V_{zy}\cos\theta_T\sin\theta_R]\sin\phi\end{array}}{\begin{array}{l}V_{zz}\cos\theta_T\cos\theta_R + \\ \frac{1}{2}[V_{xx} + V_{yy}]\sin\theta_T\sin\theta_R + \\ \frac{1}{2}[[V_{yx} + V_{xy}]\sin\theta_T\sin\theta_R\sin 2\phi + \\ \frac{1}{2}[[V_{xx} - V_{yy}]\sin\theta_T\sin\theta_R\cos 2\phi\end{array}}$$

The maximum of $|V|$ is achieved at $\phi=0$ if x is chosen to be the direction normal to the bedding. Evaluated at the angle $\theta=0$, Eq. (1.5) produces:

$$\frac{V_{RT}(0)}{V_{RT}(180)} \cong 1 + 2\frac{C_0(\theta_T, \theta_R) + C_{1c}(\theta_T, \theta_R)}{C_0(\theta_T, \theta_R) + C_{2c}(\theta_T, \theta_R)} \quad (1.6)$$

$$\cong 1 + 2\frac{[V_{xz}\sin\theta_T\cos\theta_R + V_{zx}\cos\theta_T\sin\theta_R]}{V_{zz}\cos\theta_T\cos\theta_R + V_{xx}\sin\theta_T\sin\theta_R}$$

This, however, is still not the pure xz-zx type of responses that are desired, i.e., which are insensitive to bedding anisotropy and dip angle.

The present invention relates to directional measurements that are insensitive to anisotropy of the formation at a wide range of dip angles and over a wide frequency range. Now with a symmetrization procedure $(\theta_T \leftrightarrow \theta_R)$, as prescribed by Minerbo et al, we have:

$$\frac{V_{RT}(0, \theta_T, \theta_R)}{V_{RT}(180, \theta_T, \theta_R)} - \frac{V_{RT}(180, \theta_R, \theta_T)}{V_{RT}(0, \theta_R, \theta_T)} \cong \quad (1.7)$$

$$1 + 2\frac{[V_{xz} - V_{zx}]\sin(\theta_T - \theta_R)}{V_{zz}\cos\theta_T\cos\theta_R + V_{xx}\sin\theta_T\sin\theta_R}$$

This again is similar to the response of the induction type, although the denominator still has some components that are not simply [xz-zx]. This proves that the symmetrization procedure for propagation style measurement can produce responses similar to that of the symmetrized induction type, but not a pure type. It is also true that propagation measurement can be done at two arbitrary orientations in the azimuthal response.

Thus, the orientation of the bedding is determined by examining the azimuthal dependence of the logging tool response. One technique for extracting the different components (i.e., coefficients) of the azimuthal response is disclosed in a U.S. patent application by Li et al. entitled "Directional Electromagnetic Wave Resistivity Apparatus and Method" filed on Apr. 21, 2004 and assigned Ser. No. 10/709,212, wherein the measured azimuthal variation of a signal is fitted to approximate functions. In particular, the azimuthal response is fitted according to extracts of the relevant sin and cos terms of the directional measurements, taken iteratively. Such a fitting algorithm is done in a digital signal processor through an integer algorithm so it is fast enough to be performed for all channels within 4-ms of sampling time. The precise use of azimuth angle information, and the randomization of the acquisition sequences, makes the algorithm robust to tolerate irregular tool rotation as well as stick-and-slip under rough drilling conditions. This way, all the data are used to obtain the up/down signal instead of only the data in the two bins, thus improving the signal-to-noise ratio in the measurement. The use of precise azimuth angles also makes the determined bedding orientation more precise.

The detail algorithm can be described as follows.

Floating point implementation: starting with an initial value of matrix $P_0$ and vector $U_0$, then proceeding to the algorithm described below with measurement $y(\phi_i)$ and basis $r = (1 \cos \phi_i \sin \phi_i \cos 2\phi_i \sin 2\phi_i)^T$, where P is a matrix of dimension M×M and U and r are vectors of dimension M. M is the dimension of the basis function. After iteration N, then U will converge to a value which represents the coefficients of the expression. This algorithm is stable and convergence is usually achieved within 10–15 iterations.

The detailed algorithm is shown below:

--- initialize $P_0$ and $U_0$;
for m = 1 to Nsamples $$P_m \leftarrow P_{m-1} - \frac{P_{m-1} \cdot r_{m-1}^T \cdot r_{m-1} \cdot P_{m-1}}{1 + r_{m-1} \cdot P_{m-1} \cdot r_{m-1}^T}$$

$$U_m \leftarrow U_{m-1} - P_m \cdot r_{m-1}^T \cdot (y_{m-1} - U_{m-1}^T \cdot r_{m-1}^T)^T;$$

next m;
return(U);

--- where:

N samples is the total number of samples acquired in one cycle,

M is the dimension of the approximate function vector (number of approximation functions), U is the vector of fitting coefficients of dimension M, r is the vector of approximate function values at each measure position of dimension M, and P is a matrix of dimension M×M.

In many cases, floating point implementation will be too expensive to perform with presently available downhole cpu's because there may be hundreds of channels to be fitted and the data acquisition for each azimuth angle has to be quite short (ms) in order for the angle to be accurate at higher rotation speed. In these situations, an integer implementation can be applied, with some modification, to improve accuracy (e.g., use 32-bits for multiplication), perform resealing to avoid overflow, and to accelerate convergence. The values of the basis function can also be pre-generated and stored in memory so as to be interpolated later to obtain the value for the true angle $\phi_i$.

Since only the relevant signals are extracted in the fitting technique, only the useful coefficients need to be saved. Thus, in this case, it's only necessary to save 5 coefficients, as compared to 32 if one were to bin all the data using the 32-bin example. Those skilled in the art will appreciate the advantages of the inventive technique which include the accuracy of the extracted signal and a particular improvement in the accuracy of the azimuthal angle.

From these fitting coefficients, the bedding boundary azimuthal (strike) angle may be determined.

FIG. 5 is a schematic representation of a directional measurement logging tool 36' having an axis BA and being disposed in a borehole segment 11 that lies within a single formation bed $B_2$. The bed $B_2$ is separated from overlying bed $B_1$ by a boundary $P_1$, and is separated from an underlying bed $B_3$ by a boundary $P_2$. In this configuration, symmetrized directional measurements obtained from couplings $T_1$–$R_1$ and $T_2$–$R_2$ (according to Minerbo at al) have proven to be insensitive to dip $\alpha$ and anisotropy.

Figure 6:
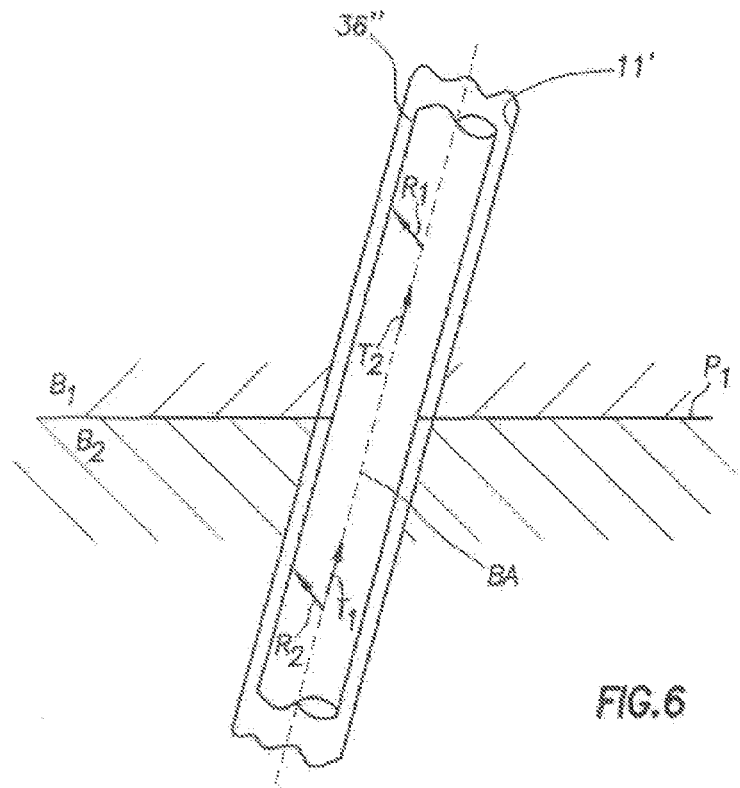
FIG. 6 is a schematic representation of a directional measurement logging tool disposed in a borehole segment that traverses a bed boundary to penetrate two formation beds, whereby symmetrized directional measurements nearly constant and are proportional to dip for a given resistivity profile when the transmitter(s) and receiver(s) are positioned on opposite sides of the bed boundary.

FIG. 6, however, illustrates a configuration wherein such directional measurements are extremely sensitive to dip. Thus, FIG. 6 is a schematic representation of a directional measurement logging tool 36" having an axis BA and disposed in a borehole segment 11' that traverses a bed boundary $P_1$. The borehole 11' penetrates two formation beds $B_1$, $B_2$, and the logging tool is configured (and positioned) so that transmitter $T_1$ and receiver $R_2$ are disposed on one side of the boundary $P_1$, while transmitter $T_2$ and receiver $R_1$ are disposed on the other side of the boundary $P_1$. In such an arrangement, the symmetrized directional measurements obtained with tool 36" are nearly constant and are proportional to dip for given a resistivity profile.

Figure 7:
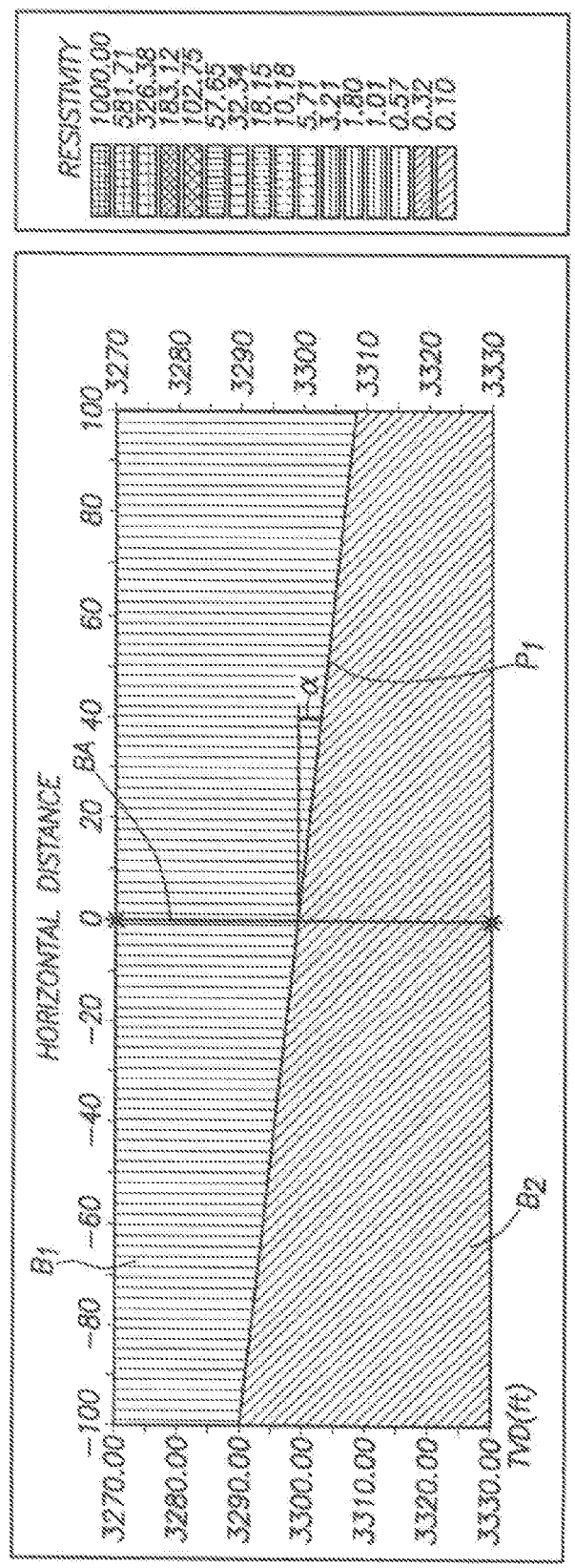
FIG. 7 is a resistivity plot depicting a single formation boundary that divides two adjacent formation beds.

FIG. 7 is a resistivity plot depicting a borehole segment axis BA that traverses a single formation boundary $P_1$ that divides two adjacent formation beds $B_1$, $B_2$. In this example, the adjacent formation beds exhibit a 20/1 $\Omega$m resistivity transition across the boundary $P_1$, and a dip $\alpha = 5°$.

Figure 8A:
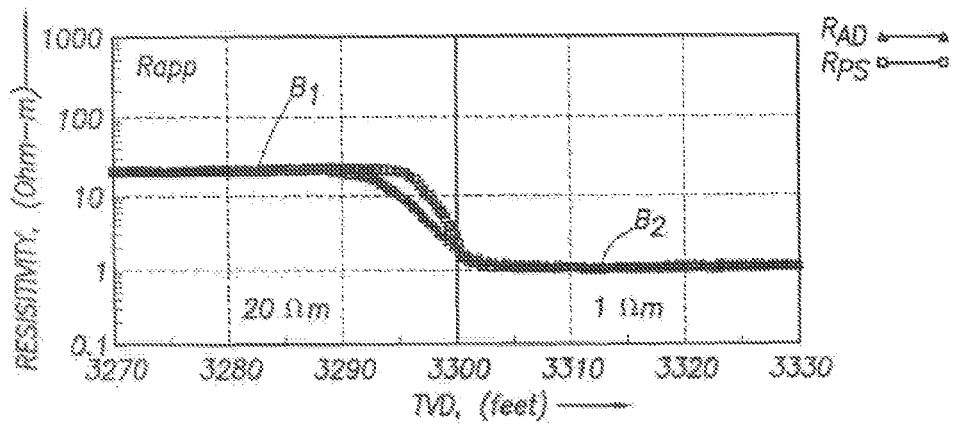
FIGS. 8A–8C show plots representing the formation responses (conventional resistivity and symmetrized directional measurements) to electromagnetic energy transmitted by a logging tool oriented along a borehole/tool axis, with the logging tool having antennas positioned on either side of the boundary.
Figure 8B:
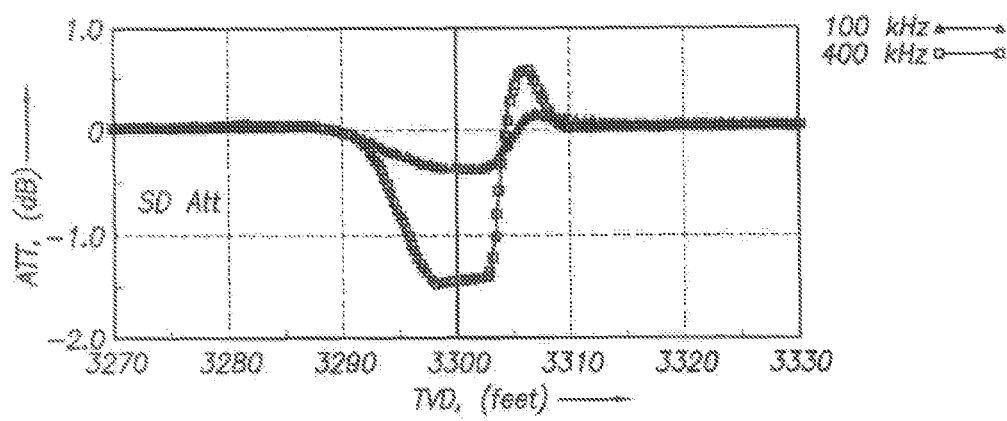
Figure 8C:
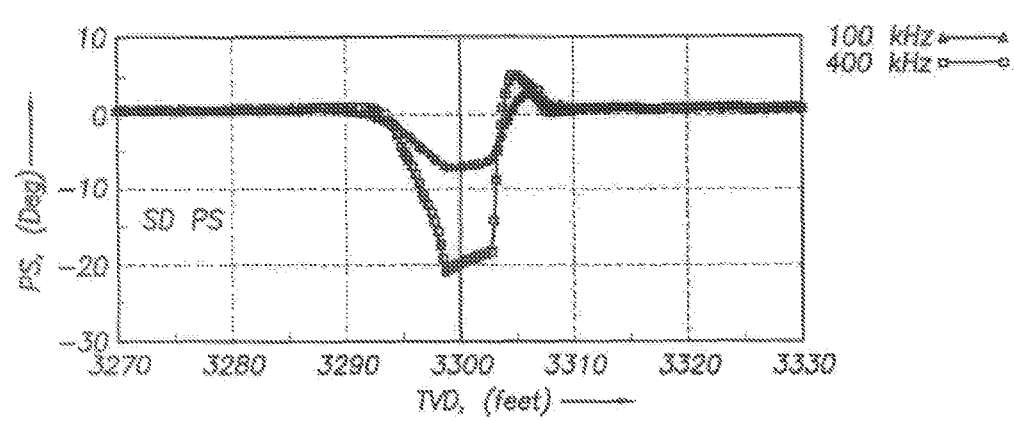

FIGS. 8A–8C show plots representing the formation responses to electromagnetic energy transmitted by a logging tool as oriented in FIG. 7, with the antennas of the logging tool being on opposite ides of the boundary $P_1$ (in similar fashion to FIG. 6). Thus, FIG. 8A depicts a conventionally-determined resistivity profile across beds $B_1$, $B_2$. FIGS. 8B, 8C depict attenuation and phase shift, respectively, resulting from symmetrized directional measurements with the antennas located across the formation boundary (as in FIG. 7). Accordingly, the portions of the plotted curves in FIGS. 8B and 8C that are nearly constant (i.e., the nearly "flat" lower segments) represent the measurements taken while the antennas were positioned on either side of the boundary $P_1$.

The symmetrized directional response was found to be insensitive to the dip angles and anisotropy for high relatively dip angle (e.g., >60°) and when both transmitter and receivers are on the same side of the boundary (see Minerbo at al). For smaller relative dip (e.g., <40°), it turns out that the response of the symmetric directional measurements (xz-zx type) is directly proportional to the relative dip angle, if transmitters and receivers are on opposite sides of the boundary, as will be described below.

Figure 9:
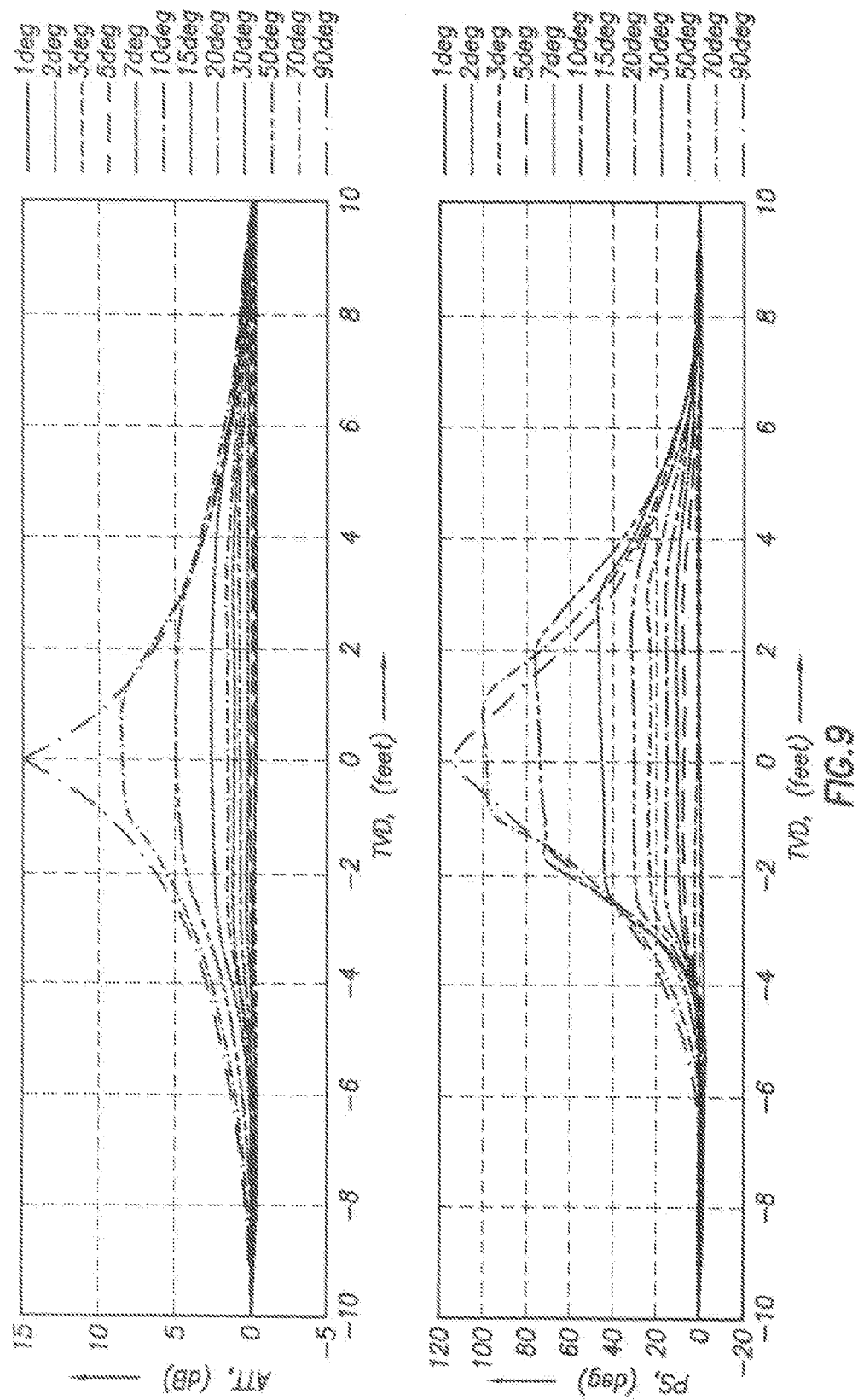
FIG. 9 shows the response of symmetrized directional propagation signals plotted as a function of true vertical depth (TVD) for different dip angles when crossing a bed boundary, according to one aspect of the present invention.

FIG. 9 shows the response of a directional propagation signal at 100 kHz, plotted as a function of the tool position in true vertical depth (TVD) when crossing from a bed of 1 ohm-m to a bed of 10 ohm-m. The signal gradually increases as the relative dip angle increases. At zero relative dip, there is no variation of signal coming out of the structure as tool rotates because of symmetry. Thus the signal is null. However, as soon as the relative dip becomes non-zero, a finite signal will be generated. In fact, as observed from the plot, even at 10 relative dip, the phase shift signal is slightly larger than 1°, which is quite sizeable considering the accuracy of the measurement that can be achieved with the present-day electronics.

Figure 10:
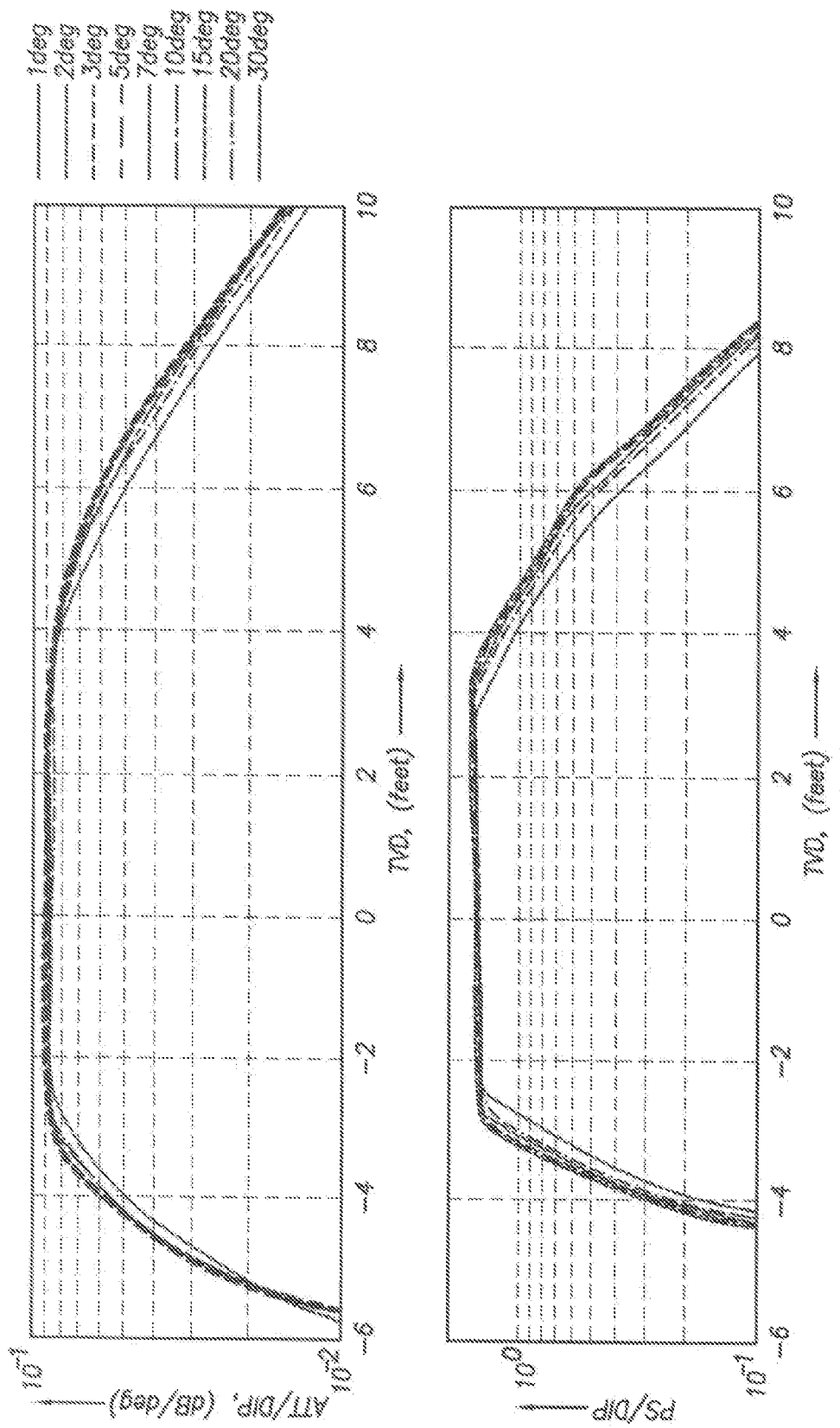
FIG. 10 shows a similar response to that of FIG. 9, but the propagation signals are normalized by dip angle, on a logarithmic scale.

FIG. 10 shows the same response as FIG. 9 for relative dip angles up to 30°, but with the phase-shift and attenuation signals normalized by the relative dip angle. The normalized curves stack on top of each other, independent of the dip angle. This is especially true in the middle when the transmitter and receiver are on opposite side of the bed boundary. What this means is that the phase shift and attenuation signal from the symmetrized response is linearly proportional to the dip angle and this proportionality constant is almost independent of the tool position when T and R are on opposite side of the boundary. Of course the linear factor depends on TR spacing, measurement frequency and the resistivity of the two beds-mostly on the value of the more conductive part of the two beds.

Figure 11:
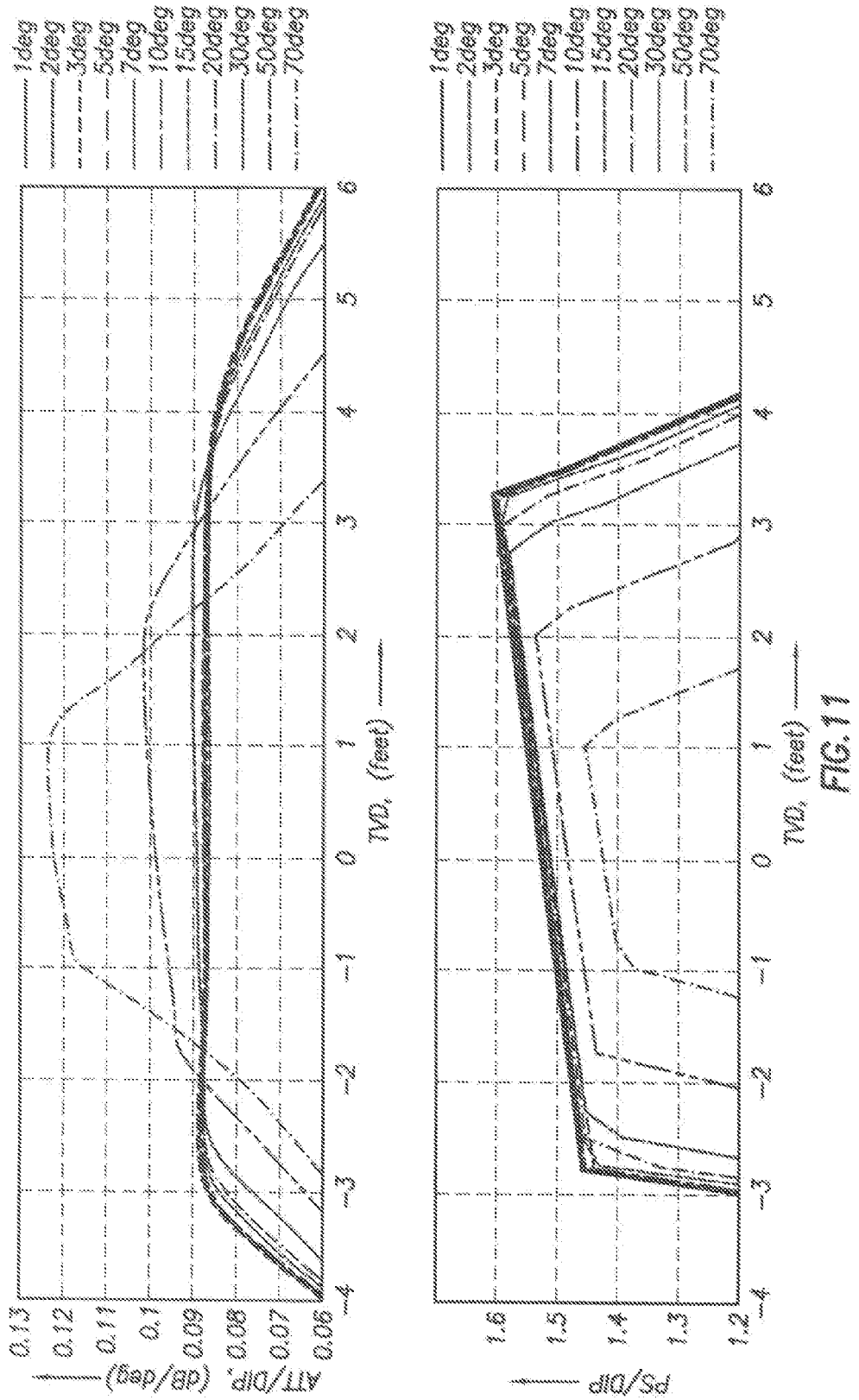
FIG. 11 shows a similar normalized response to that of FIG. 10, on a linear scale.

Dip angle-normalized responses of the 100 kHz directional measurements are again presented in FIG. 11 including angles up to 70°, on a linear scale. The scaling coefficient for a phase shift of 50° is shown to be 2% smaller, and for 70° is 6% smaller, than for smaller phase shift angles. Attenuations are more sensitive, showing changes of 15% and 40% at 50° and 70°, respectively.

Figure 12:
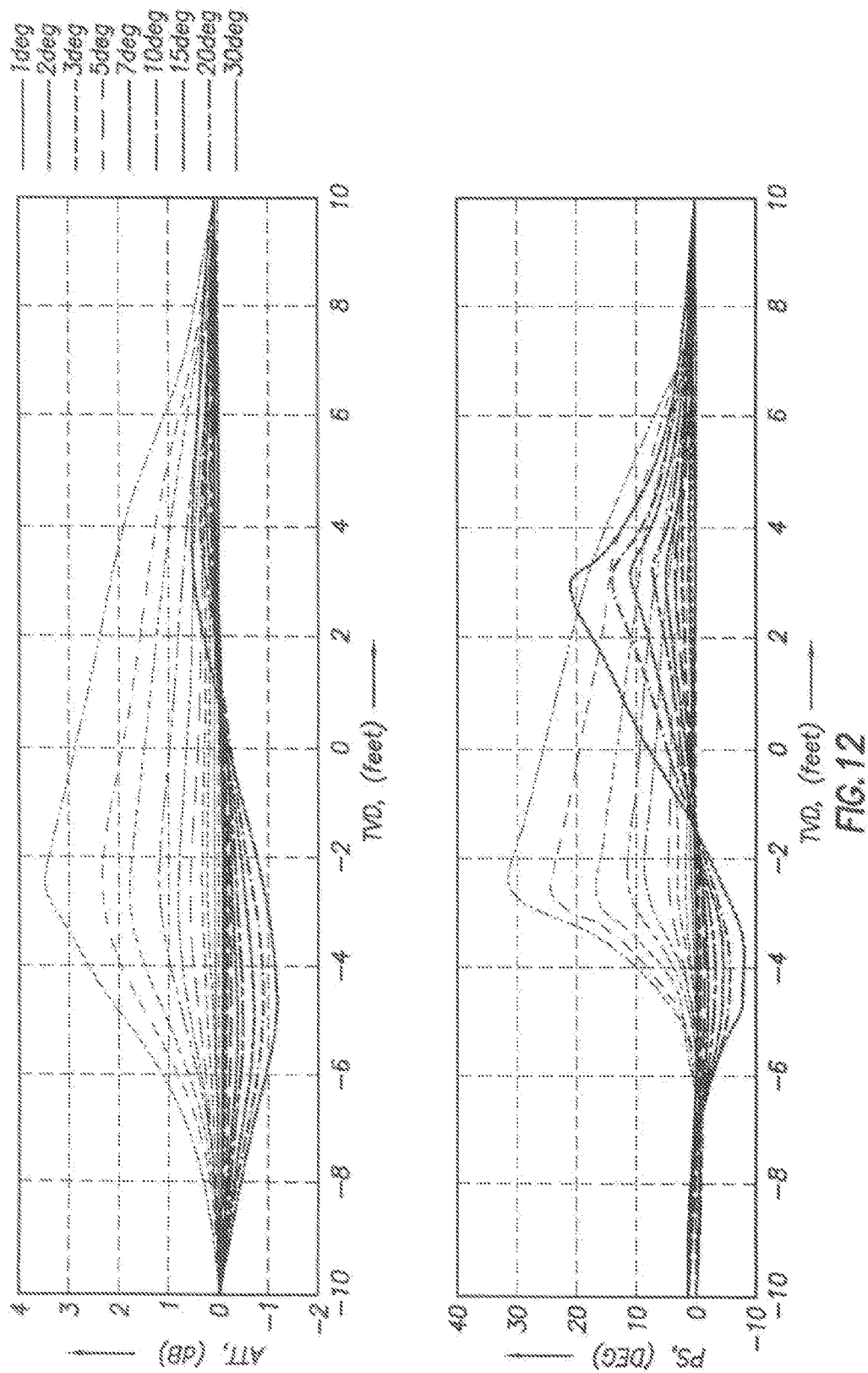
FIG. 12 shows a similar response to that of FIG. 9, but representing a single transmitter-receiver (TR) pair prior to symmetrization.

It is important to note that such simplicity of response is a direct result of symmetrization. FIG. 12 shows the response of the individual TRR pairs before symmetrization, under exactly the same configuration as in FIG. 9. The responses are much more complex. The linear relationship between measured signals and the formation dip that we clearly see for symmetrized TR configurations no longer holds. Symmetrization simplifies the tool response to bed boundary in high angle wells and it again does the same thing for dip sensitivity. The underlying physics are related.

Figure 13:
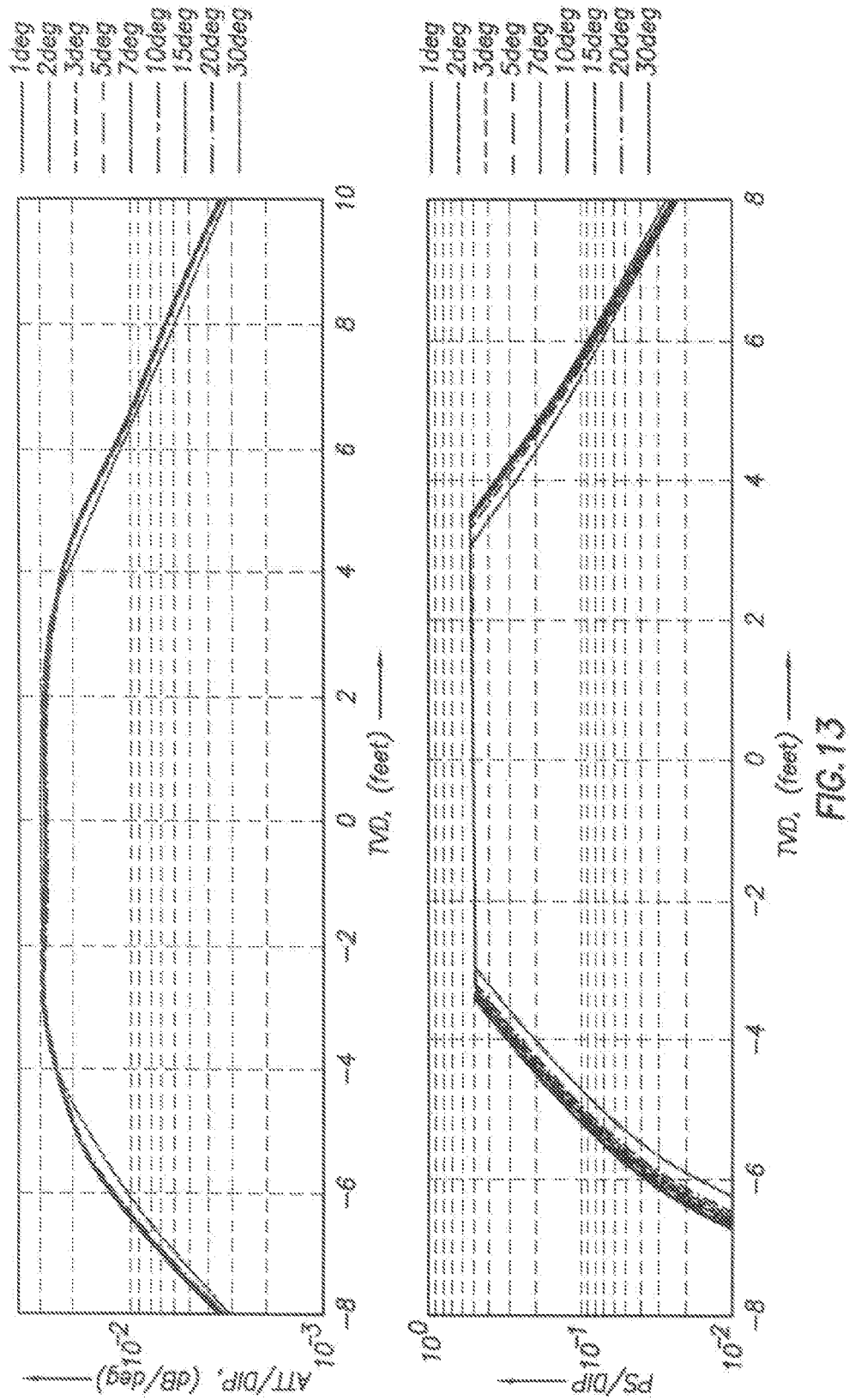
FIG. 13 shows a similar response to that of FIG. 10, but representing two co-located TR pairs.

FIGS. 9–12 are for TR antenna pairs not located at the same physical spaces, even though the TR distance is fixed for the two pair as required for symmetrization. FIG. 13 shows the normalized response for two co-located TR pairs. This is to be compared with FIG. 10. The response of colocated and non-colocated TR pairs to dip is quite similar.

FIG. 14 shows the equivalent induction tool response of (xz-zx) symmetric pairs at 10 kHz, normalized to the apparent dip angle. Both the real and imaginary portions of the receiver voltage can be scaled as dip, to a very good approximation. The proportionality factor is almost a constant for the real part of the voltage and varies linearly with distance, when the transmitter and receiver pair are on two sides of the interface.

The simple relationship of symmetrized directional response to relative dip will allow for accurate determination of the relative dip and azimuth of the structure bedding. For example, at dip=1, the phase-shift signal from FIG. 9 is about 0.09 dB and 1.6°. Even with the electronics, the phase-shift and attenuation can be measured to 0.02° and 0.004 dB, respectively. This means that dip can be measured with an accuracy of 0.010°–0.03°, if such accuracy is required—in which case very accurate sensors will be utilized. By comparison, this degree of accuracy is two orders of magnitude smaller than what known borehole imaging tools can provide. More realistically, taking into account the anticipated environmental effect, it is possible to measure relative dips with an accuracy of 10%, even at very low relative dip angles.

Once the relative dip is determined, the directional response can be used to derive the distance to boundary estimate when the sensors are away from the boundary.

It is also interesting to note the drastic difference between the tool response when the receivers and the transmitters are on opposite sides of the boundary and that when both transmitters and receivers are on the same side. The slope of the responses as a function of depth abruptly changes when the crossing occurs. This change can be used to identify the bed boundary position accurately.

The technique applies to both wireline induction and LWD propagation tools, independent of the method of conveyance. For "while drilling" applications, this information can be obtained in real-time by sending the measurements up-hole and analyzing them at the surface, or by analyzing the data downhole first and then sending the dip structure information up to the surface.

Those skilled in the relevant art will appreciate that while the response depends on bedding properties such as resistivities, it also depends the receiver-transmitter spacing and frequency.

Figure 15:
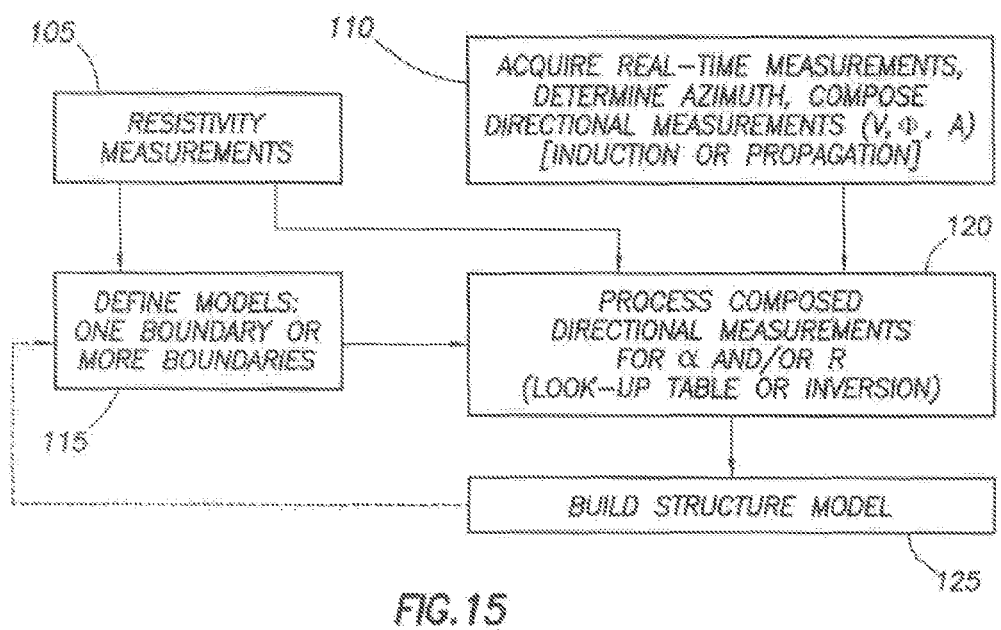
FIG. 15 is a work flow diagram for dip determination in accordance with one aspect of the present invention.

A particular aspect of the present invention will now be described, with reference to FIG. 15. Real-time directional measurements are acquired, the bed boundary azimuth is determined, and directional measurements are composed (all as described above), using a logging instrument disposed in a borehole in the vicinity of one or more beds of interest (box 110).

Resistivities of the formation on each side of the identified boundary are determined using standard resistivity measurements, induction or propagation (box 105). Selected directional channels from the acquired directional voltage signals are useful for precisely determining the dip angle and location of the boundary. The determined dip angle may be confirmed using different directional channels from the acquired directional voltage signals, using a look-up table, or by inversion techniques (box 120). The simple chart or look-up table procedure is originally thought for single boundary dip determination.

A symmetrized measurement response is generated, and this response is scaled based on known resistivities, to predict the dip angle of the formation bed (i.e., a boundary for the bed) of interest. The scaling step corresponds to a scaling coefficient. A boundary for the formation bed of interest is identified by moving the logging instrument within the borehole, generating new directional measurements and symmetrized response, scaling the symmetrized response, and observing changes in the response (box 120).

In one embodiment, the apparent dip-determining step comprises using a look-up table. In this instance, the method further includes the steps of determining a scaling factor for a selected pair of determined resistivities by calculating the boundary directional-response per unit dip, determining the relative dip by dividing the composed directional measurement by the scaling factor, and using a look-up table for the selected pair of resistivities and the determined relative dip and azimuth to determine the true dip. The look-up table can be pre-computed for numerous resistivity pairs. Then from apparent resistivities, we can easily find in the table how many units (deg, dB or Volts) per deg dip we have. The alternative is to build a 3D look-up table with the dip included, and employ the simple look-up table procedure.

Alternatively, a scaling factor is determined from the determined resistivity profile by calculating the boundary directional response per unit dip, and determining the relative dip by dividing the composed directional measurement by the scaling factor.

In another embodiment, the relative dip-determining step comprises an inversion. The inversion preferably includes the steps of selecting one or more directional measurements to be used in the inversion, selecting an appropriate inversion model, verifying that the selected inversion model is consistent with other information, and determining the dip and selected inversion model parameters. The determined selected inversion model parameters preferably include the position of the formation boundary position, and resistivities of the formation beds on either side of the boundary.

The model building or selection step (box 125) preferably includes selecting the simplest model that fits the known information, and creating a visualization of the selected directional measurements. The model selection step preferably further includes the use of algorithms to penalize the model complexity, such as Akaike Information Criterion. The model-based inversion should be flexible, to allow selection of parameters, from 1 (dip only) to 6 (dip, boundary position and anisotropic resistivities of two beds). The process may be interactive or batch log processing. The model-based inversion can be used for one or more boundaries (arbitrary resistivity profile).

It will be apparent to those skilled in the art that this invention may be implemented using one or more suitable general-purpose computers having appropriate hardware and programmed to perform the processes of the invention. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art. It will also be appreciated that the techniques of the invention may be used with any type of well logging system, e.g. wireline tools, LWD/MWD tools, or LWT tools.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A method for characterizing a subsurface formation with a logging instrument disposed in a borehole penetrating the formation, the logging instrument having a longitudinal axis and being equipped with at least a transmitter system and a receiver system, the method comprising the steps of:
positioning the logging instrument within the borehole so that the transmitter system and receiver system are disposed in the vicinity of a formation boundary of interest;
measuring the azimuthal orientation of the logging instrument;
transmitting electromagnetic energy into the formation using the transmitter system;
measuring signals associated with the electromagnetic energy transmitted by the transmitter system using the receiver system;
determining the relative azimuth of the formation boundary;
composing a symmetrized directional measurement using the measured signals and the determined relative boundary azimuth; and
determining the relative dip of the formation boundary using the composed directional measurement.

2. The method of claim 1, further comprising the steps of determining true azimuth and true dip of the formation boundary.

3. The method of claim 1, wherein:
the logging instrument is carried within a drill string for rotation therewith;
the transmitter system comprises first and second transmitter antennas; and
the receiver system comprises first and second receiver antennas;
the second transmitter antenna having a magnetic dipole-moment whose tilt corresponds to the tilt of the first receiver antenna's magnetic dipole-moment, and the second receiver antenna having a magnetic dipole-moment whose tilt corresponds to the tilt of the first transmitter antenna's magnetic dipole-moment, such that:
at least one of the first antennas has a tilted magnetic dipole-moment with respect to the axis of the logging instrument, the tilted magnetic dipole-moment of the one first antenna corresponding to a first azimuthal angle, and
at least one of the second antennas has a tilted magnetic dipole-moment with respect to the axis of the logging instrument, the tilted magnetic dipole-moment of the one second antenna corresponding to a second azimuthal angle.

4. The method of claim 3, wherein the second azimuthal angle differs from the first azimuthal angle by substantially 90 degrees.

5. The method of claim 3, wherein the second azimuthal angle is substantially equal to the first azimuthal angle.

6. The method of claim 1, wherein:
the logging instrument is carried within a drill string for rotation therewith;
the transmitter system comprises at least one antenna having a magnetic dipole-moment that is tilted with respect to the axis of the logging instrument by an angle $\theta$;

the transmitting step is conducted while the logging instrument is being rotated with the drill string;

the receiver system comprises at least one antenna having a magnetic dipole-moment that is tilted with respect to the axis of the logging instrument by an angle 180-θ; and the measuring steps are conducted while the logging instrument is being rotated with the drill string.

7. The method of claim 6, wherein the azimuth of the logging instrument is determined using a tool face sensor.

8. The method of claim 6, wherein a relative boundary azimuth is determined using binning.

9. The method of claim 6, wherein a relative boundary azimuth is determined by referencing the measured azimuthal angles corresponding to the minimum and maximum magnitudes among the measured signals.

10. The method of claim 6, wherein:
the measured signals are complex voltage signals; and further comprising the step of:
calculating the phase-shift and attenuation values from the measured voltage signals associated with the relative boundary azimuth.

11. The method of claim 10, wherein the phase-shift and attenuation values are obtained by taking the logarithm of the ratio of the complex voltage signals obtained from two distinct preselected azimuthal angles.

12. The method of claim 11, wherein the two azimuthal angles are 0 and 180 degrees from the determined relative boundary azimuth.

13. The method of claim 1, wherein the directional measurement-composing step includes extracting both the magnitude and the phase of the signals by fitting the response of the measured signal at different instrument azimuthal orientations to approximate functions.

14. The method of claim 13, wherein the fitting functions are sinusoids having fitting coefficients that include constant, sin φ, cos φ, sin 2φ and cos 2φ terms that define an iterative fitting algorithm useful for determining the azimuthal dependence of the directional measurements.

15. The method of claim 1, wherein:
the transmitter system comprises at least first and second transmitter antennas;
the receiver system comprises at least first and second receiver antennas;
the antennas being oriented such that the first transmitter and first receiver antennas define a first symmetric antenna pair, and the second transmitter and second receiver antennas define a second symmetric antenna pair, and the magnetic dipole-moment of at least one of the antennas form a substantially nonzero angle with the logging instrument.

16. The method of claim 15, wherein:
the measured signals are complex voltage signals; and further comprising the step of:
calculating the phase-shift and attenuation values from the measured voltage signals associated with the relative boundary azimuth.

17. The method of claim 16, wherein the phase-shift and attenuation values are obtained by taking the logarithm of the ratio of the complex voltage signals obtained from two distinct preselected azimuthal angles.

18. The method of claim 17, wherein the two azimuthal angles are 0 and 180 degrees from a determined relative boundary azimuth.

19. The method of claim 1, further comprising the step of: determining the resistivity profile across the formation boundary.

20. The method of claim 19, wherein the relative dip-determining step comprises determining the resistivity profile across the formation boundary.

21. The method of claim 19, wherein the resistivity profile is determined either from known pilot hole data or from downhole resistivity measurements.

22. The method of claim 21, wherein the downhole resistivity measurements are provided by the logging instrument or by another tool conveyed in a common tool string with the logging instrument.

23. The method of claim 19, wherein the relative dip-determining step comprises using a precalculated look-up table for directional measurements for selected values of the resistivity of two formation beds divided by the formation boundary and the relative dip angle.

24. The method of claim 19, wherein the relative dip-determining step comprises:
determining the actual resistivity values of two formation beds divided by the formation boundary;
using one or more precalculated look-up tables for the selected pair of resistivities to determine the boundary directional-response per unit dip corresponding to the actual resistivity values; and
determining the relative dip by dividing the composed directional measurement by a scaling factor, the scaling factor being determined from the determined resistivity profile by calculating the boundary directional response per unit dip.

25. The method of claim 19, further comprising the steps of:
determining a scaling factor from the determined resistivity profile by calculating the boundary directional response per unit dip; and
determining the relative dip by dividing the composed directional measurement by the scaling factor.

26. The method of claim 19, wherein the relative dip-determining step comprises an inversion.

27. The method of claim 26, wherein the inversion comprises the steps of:
selecting one or more directional measurements to be used in the inversion;
selecting an appropriate inversion model;
verifying that the selected inversion model is consistent with other information; and
determining the relative dip and selected inversion model parameters.

28. The method of claim 27, wherein the determined selected inversion model parameters comprise the position of the formation boundary, and resistivities of the formation beds on either side of the boundary.

29. The method of claim 27, wherein the model selection step includes selecting the simplest model that fits the known information.

30. The method of claim 27, wherein the verifying step includes the step of:
comparing the selected model to known geological characteristics and other measured formation parameters.

31. The method of claim 1, wherein the logging instrument is a non-rotating or slowly rotating wireline or drill string-conveyed tool.

32. The method of claim 31, wherein the measured signals are complex voltage responses from the formation.

33. The method of claim 31, wherein:
the transmitter system comprises two transmitter antennas, each transmitter antenna having a magnetic dipole-moment aligned with the instrument axis;

the receiver system comprises two transverse receiver antennas with their magnetic dipole-moments oriented at different orientations but both perpendicular to the axis of the logging instrument, the two receiver antennas being positioned between the two transmitter antennas at a first borehole depth substantially midway between the two transmitter antennas.

34. The method of claim 31, wherein:
the receiver system comprises a receiver antenna having a magnetic dipole-moment aligned with the instrument axis;
the transmitter system comprises two transverse transmitter antenna pairs with the magnetic dipole-moments of each pair being oriented at different orientations but both being perpendicular to the axis of the logging instrument, the receiver antenna being positioned between the two transmitter antenna pairs at a first borehole depth substantially midway between the two transmitter antenna pairs.

35. The method of claim 33, wherein:
the transmitting step includes energizing one of the two transmitter antennas so as to transmit electromagnetic energy into the formation;
the measuring step includes
measuring first voltage signals associated with the electromagnetic energy transmitted by the one transmitter antenna, using the two receiver antennas,
measuring the azimuth of the logging instrument;
determining the relative boundary azimuth; and
composing a first directional measured voltage signal of a virtual transverse receiver at the relative boundary azimuth using a rotation matrix corresponding to the determined relative boundary azimuth with respect to the instrument azimuth; and
further comprising the steps of:
moving the logging instrument within the borehole so as to position the other of the two transmitter antennas to the first borehole depth;
energizing the other of the two transmitter antennas so as to transmit electromagnetic energy into the formation;
measuring second voltage signals associated with the electromagnetic energy transmitted by the other transmitter antenna, using the two receiver antennas;
measuring the azimuth of the logging instrument;
determining the relative boundary azimuth; and
composing a second directional measured voltage signal of a virtual transverse receiver at the relative boundary azimuth using a rotation matrix corresponding to the determined relative boundary azimuth with respect to the instrument azimuth; and
combining the composed first and second voltage signals of the virtual transverse receiver to compose the symmetrized directional measurement.

36. The method of claim 31, wherein:
the transmitter system comprises tri-axial transmitter antennas;
the receiver system comprises tri-axial receiver antennas.

37. The method of claim 36, wherein the magnetic dipole-moment vectors of the three transmitter antennas are linearly independent, and the antenna-effective area vector of the three receivers are linearly independent.

38. The method of claim 36, wherein the magnetic dipole-moment vectors of the three transmitter antennas are mutually orthogonal.

39. The method of claim 36, wherein the magnetic dipole-moment vectors of the three receiver antennas are mutually orthogonal.

40. The method of claim 36, wherein the three transmitter antennas are substantially colocated.

41. The method of claim 36, wherein the three receiver antennas are substantially colocated.

42. The method of claim 36, wherein:
the transmitting step includes
energizing one of the three transmitter antennas so as to transmit electromagnetic energy into the formation;
energizing a second of the three transmitter antennas so as to transmit electromagnetic energy into the formation;
energizing a third of the three transmitter antennas so as to transmit electromagnetic energy into the formation;
the measuring step includes
measuring first voltage signals associated with the electromagnetic energy transmitted by the one transmitter antenna, using the three receiver antennas,
measuring second voltage signals associated with the electromagnetic energy transmitted by the second transmitter antenna, using the three receiver antennas;
measuring third voltage signals associated with the electromagnetic energy transmitted by the third transmitter antenna, using the three receiver antennas; and
further comprising the steps of:
linearly combining the voltage signals measured by the respective three receivers to generate voltages representing virtual transmitter and receiver pairs of arbitrary orientations;
composing the coupling voltages between three mutually orthogonal virtual transmitters and receivers; and
composing the symmetrized directional measurement using the coupling voltages for symmetric transmitter and receiver pairs.

43. The method of claim 37, wherein signals of virtual transmitter-receiver pairs of a fixed orientation are generated from the measured first, second, and third voltage signals through a 3D-space rotation matrix corresponding to the fixed orientation.

44. The method of claim 42, wherein the relative boundary azimuth is determined according to:
$\tan^{-1}(YZ/XZ)$ or $\tan^{-1}(2*XY/(XX-YY))$,
where:
YZ is the voltage of the Y-oriented receiver and Z-oriented transmitter antennas of unit magnetic dipole-moment,
XZ is the voltage of the X-oriented receiver and Z-oriented transmitter antennas of unit magnetic dipole-moment,
XY is the voltage of the X-oriented receiver and Y-oriented transmitter antennas of unit magnetic dipole-moment,
XX is the voltage of the X-oriented receiver and X-oriented transmitter antennas of unit magnetic dipole-moment,
YY is the voltage of the Y-oriented receiver and Y-oriented transmitter antennas of unit magnetic dipole-moment,
Z is in direction along the instrument axis,
X is in the direction of the reference azimuth angle, and perpendicular to Z,
Y is perpendicular to X and Z; and
X-Y-Z forms a Cartesian coordinate system.

45. The method of claim 42, wherein the directional measurements are composed using an X'Z-ZX' coupling voltage, where X' is in the direction of the relative boundary azimuth and is perpendicular to the instrument axis Z.

46. The method of claim 6, wherein:
the transmitter system comprises two spaced-apart transmitter antennas, each transmitter antenna having a magnetic dipole-moment that is tilted with respect to the instrument axis by a first angle;
the receiver system comprises at least one receiver antenna positioned between the two transmitter antennas at a first borehole depth, the receiver antenna having a magnetic dipole-moment that is tilted with respect to the instrument axis by a second angle.

47. The method of claim 46, wherein:
the transmitting step includes energizing one of the two transmitter antennas so as to transmit electromagnetic energy into the formation;
the measuring step includes
measuring first voltage signals associated with the electromagnetic energy transmitted by the one transmitter antenna, using the receiver antenna,
determining the azimuthal orientation of the logging instrument, and
rotating the drill string so as to rotate the transmitter and receiver antennas about the axis of the logging instrument, and
further comprising the steps of:
moving the logging instrument within the borehole so as to move the other of the two transmitter antennas to the first borehole depth;
energizing the other of the two transmitter antennas so as to transmit electromagnetic energy into the formation;
measuring second voltage signals associated with the electromagnetic energy transmitted by the other transmitter antenna, using the receiver antenna;
determining the azimuthal orientation of the logging instrument; and
rotating the drill string so as to rotate the transmitter and receiver antennas about the axis of the logging instrument;
the relative boundary azimuth being determined from the measured first and second voltage signals; and
the measured first and second voltage signals being combined to compose the symmetrized directional measurement.

48. A method for characterizing a subsurface formation with a logging instrument disposed in a borehole penetrating the formation, the logging instrument having a longitudinal axis and being equipped with at least a transmitter system and a receiver system that collectively comprise at least one set of upper antennas and one set of lower antennas,
the method comprising the steps of:
positioning the logging instrument within the borehole so that the transmitter system and receiver system are disposed in the vicinity of a formation boundary of interest;
measuring the azimuthal orientation of the logging instrument;
transmitting electromagnetic energy into the formation using the transmitter system;
measuring signals associated with the electromagnetic energy transmitted by the transmitter system using the receiver system;
composing a symmetrized directional measurement using the measured signals; and
identifying the depth at which at least one of the upper and lower antennas crosses the formation boundary using a discontinuity in the rate of the change in the directional measurement.

49. A logging apparatus for characterizing a subsurface formation penetrated by a borehole, comprising:
a body adapted for conveyance in the borehole and having a longitudinal axis;
a transmitter system carried by the body for transmitting electromagnetic energy into the formation;
a receiver system carried by the body for measuring signals associated with the electromagnetic energy transmitted by the transmitter system;
means for determining the relative azimuth of a formation boundary of interest in the vicinity of the borehole;
means for composing a symmetrized directional measurement using signals measured by the receiver system and the relative boundary azimuth determined by the azimuth-determining means; and
means for determining the relative dip of the formation boundary using the composed directional measurement.

50. The logging apparatus of claim 49, wherein the body is adapted for conveyance within a drill string, and is further adapted for rotation with the drill string.

51. The logging apparatus of claim 49, wherein the body is adapted for conveyance with a wireline.

52. The logging apparatus of claim 50, wherein:
the transmitter system comprises at least one antenna having a magnetic dipole-moment that is tilted with respect to the axis of the logging instrument by an angle θ; and
the receiver system comprises at least one antenna having a magnetic dipole-moment that is tilted with respect to the axis of the logging instrument by an angle 180-θ.

53. The logging apparatus of claim 50, wherein:
the transmitter system comprises at least first and second transmitter antennas;
the receiver system comprises at least first and second receiver antennas;
the antennas being oriented such that the first transmitter and first receiver antennas define a first symmetric antenna pair, and the second transmitter and second receiver antennas define a second symmetric antenna pair.

54. The logging apparatus of claim 51, wherein:
the transmitter system comprises two transmitter antennas, each transmitter antenna having a magnetic dipole-moment aligned with the instrument axis;
the receiver system comprises two transverse, mutually orthogonal receiver antennas, the two receiver antennas being positioned between the two transmitter antennas.

55. The logging apparatus of claim 51, wherein:
the receiver system comprises two receiver antennas, each receiver antenna having a magnetic dipole-moment aligned with the instrument axis;
the transmitter system comprises two transverse, mutually orthogonal transmitter antennas, the two transmitter antennas being positioned between the two receiver antennas.

56. The logging apparatus of claim 51, wherein:
the transmitter system comprises tri-axial transmitter antennas; and
the receiver system comprises tri-axial receiver antennas.

57. The logging apparatus of claim 50, wherein the azimuth-determining means comprises a tool face sensor.

58. The logging apparatus of claim 50, wherein the azimuth-determining means comprises a computer-readable medium having computer-executable instructions for determining the relative azimuth of the formation boundary of interest.

59. The logging apparatus of claim 49, wherein the composing means comprises a computer-readable medium having computer-executable instructions for composing a symmetrized directional measurement using signals measured by the receiver system and the relative boundary azimuth determined by the azimuth-determining means.

60. The logging apparatus of claim 49, wherein the relative dip-determining means comprises a computer-readable memory having computer-executable instructions for determining the relative dip of the formation boundary using the composed directional measurement.

* * * * *